United States Patent
Triantafillou et al.

(10) Patent No.: US 9,602,222 B2
(45) Date of Patent: Mar. 21, 2017

(54) TECHNIQUES FOR SECURING BODY-BASED COMMUNICATIONS

(71) Applicant: INTEL CORPORATION, Santa Clara, CA (US)

(72) Inventors: Nicholas D. Triantafillou, Portland, OR (US); Todd A. Keaffaber, Lake Oswego, OR (US); Shai Skavas Kavas, Mevasseret (IL)

(73) Assignee: INTEL CORPORATION, Santa Clara, CA (US)

( * ) Notice: Subject to any disclaimer, the term of this patent is extended or adjusted under 35 U.S.C. 154(b) by 183 days.

(21) Appl. No.: 14/369,249

(22) PCT Filed: Dec. 13, 2013

(86) PCT No.: PCT/US2013/074913
§ 371 (c)(1),
(2) Date: Jun. 27, 2014

(87) PCT Pub. No.: WO2015/088548
PCT Pub. Date: Jun. 18, 2015

(65) Prior Publication Data
US 2016/0028492 A1    Jan. 28, 2016

(51) Int. Cl.
*H04B 13/00* (2006.01)
*H04K 1/00* (2006.01)
(Continued)

(52) U.S. Cl.
CPC .......... *H04B 13/005* (2013.01); *H04B 13/00* (2013.01); *H04K 1/00* (2013.01); *H04W 12/06* (2013.01);
(Continued)

(58) Field of Classification Search
CPC ..... H04W 12/06; H04W 76/00; H04W 76/21; H04W 84/18; H04B 13/00; H04B 13/005;
(Continued)

(56) References Cited

U.S. PATENT DOCUMENTS 8,347,094 B2 *   1/2013   Singh ................... H04L 9/0844
                                               713/169
2004/0019292 A1 *  1/2004  Drinan .................. A61B 5/053
                                               600/547
(Continued)

OTHER PUBLICATIONS

Tucker, C. & Lee, Y., "The Body is the Medium: Intelligent BodyCom(TM) Systems for Short-Range Communications," Sensors Expo & Conference: Sensing Technologies Driving Tomorrow's Solutions, Jun. 14, 2013, 35 pages, Microchip Technology Incorporated, US.

(Continued)

*Primary Examiner* — Eric W Shepperd

(57) ABSTRACT

Various embodiments are generally directed to techniques to form and maintain secure communications among two or more body-carried devices disposed in close proximity to the body of a person to form a body area network (BAN). An apparatus to establish secure communications includes a processor component; a signal component for execution by the processor component to compare a signal characteristic of a security test signal to a known signal characteristic of the security test signal to derive a bioelectric characteristic, the security test signal received via a tissue; and a bioelectric component for execution by the processor component to determine whether to allow transmission of data through the tissue based on the bioelectric characteristic. Other embodiments are described and claimed.

24 Claims, 10 Drawing Sheets

(51) Int. Cl.
*H04W 84/18* (2009.01)
*H04W 12/06* (2009.01)
*H04W 76/02* (2009.01)

(52) U.S. Cl.
CPC ......... *H04W 76/021* (2013.01); *H04W 84/18* (2013.01)

(58) Field of Classification Search
CPC .......... G06F 21/31; G06F 21/32; G06F 21/44; H04L 63/0861; H04L 63/12; H04L 63/126
See application file for complete search history.

(56) References Cited

U.S. PATENT DOCUMENTS

| | | | | |
|---|---|---|---|---|
| 2007/0205693 | A1* | 9/2007 | Takiguchi | H04R 17/00 310/314 |
| 2008/0097851 | A1* | 4/2008 | Bemmel | G06Q 30/02 705/14.36 |
| 2008/0129465 | A1* | 6/2008 | Rao | A61B 5/0031 340/286.02 |
| 2009/0124282 | A1* | 5/2009 | Kim | H04B 13/005 455/550.1 |
| 2009/0233548 | A1* | 9/2009 | Andersson | H04B 13/005 455/41.2 |
| 2011/0040492 | A1* | 2/2011 | Hwang | H04B 13/005 702/19 |
| 2011/0227856 | A1* | 9/2011 | Corroy | H04B 13/005 345/173 |
| 2012/0051314 | A1* | 3/2012 | Goyal | H04L 9/0833 370/329 |
| 2012/0162057 | A1* | 6/2012 | Tan | G06F 3/011 345/156 |
| 2013/0142363 | A1* | 6/2013 | Amento | H04K 1/00 381/151 |
| 2013/0222185 | A1* | 8/2013 | Ben Hamida | G01S 5/0215 342/387 |
| 2014/0009262 | A1* | 1/2014 | Robertson | A61B 5/0006 340/5.52 |
| 2014/0018792 | A1* | 1/2014 | Gang | A61B 18/1492 606/41 |
| 2014/0172707 | A1* | 6/2014 | Kuntagod | G06Q 20/40145 705/44 |
| 2014/0313154 | A1* | 10/2014 | Bengtsson | H04B 13/005 345/174 |
| 2014/0325614 | A1* | 10/2014 | Rhelimi | H04W 12/06 726/4 |
| 2015/0163221 | A1* | 6/2015 | Bolin | G07C 9/00309 726/7 |
| 2015/0339658 | A1* | 11/2015 | Leroy | H04B 13/005 705/44 |
| 2016/0063397 | A1* | 3/2016 | Ylipaavalniemi | G06N 99/005 706/12 |

OTHER PUBLICATIONS

Falck, et al., "Plug n' Play Simplicity for Wireless Medical Body Sensors", Mobile Networks and Applications, Jun. 2007, vol. 12, issue 2-3, pp. 143-153, Springer, US.

Nixon, et al., "Spoof Detection Schemes", Lumidigm: Handbook of Biometrics, 2007, 20 pages, Springer, US.

* cited by examiner

TECHNIQUES FOR SECURING BODY-BASED COMMUNICATIONS

TECHNICAL FIELD

Embodiments described herein generally relate to using biometric characteristics to secure communications among body-carried devices through a body.

BACKGROUND

It has become commonplace for persons to carry various electronic devices with them, and it is becoming commonplace for those electronic devices to be networked in what is commonly referred to as a personal area network (PAN) to exchange information. Such devices include wristwatches, smart phones, smart watches, smart glasses, activity monitoring devices such as pedometers, health monitoring devices such as pulse monitors, wireless earsets for audio communications, pacemakers, etc. Many PANs employ wireless radio frequency (RF) communications, and like other forms of wireless networks, have proven susceptible to security breaches in which another person uses another electronic device to wirelessly gain access to a PAN for such purposes as stealing information from one or more of the electronic devices of that PAN.

An approach to countering such security breaches has been to replace wireless RF signaling as a communications medium with the human body, forming a body area network or BAN. More precisely, the skin and/or other tissues of the body are employed as a conductive medium to convey signals between electronic devices disposed in close proximity to the body. However, BANs have also proven susceptible to security breaches arising from another person coming into skin-to-skin contact, or at least coming into close enough physical proximity as to enable another electronic on their body to be momentarily added to a BAN. Such security breaches have been known to occur in situations in which numerous persons are momentarily compelled to be in close proximity to each other, such as while riding in subways or elevators, or while waiting in a line.

DETAILED DESCRIPTION

Figure 1:
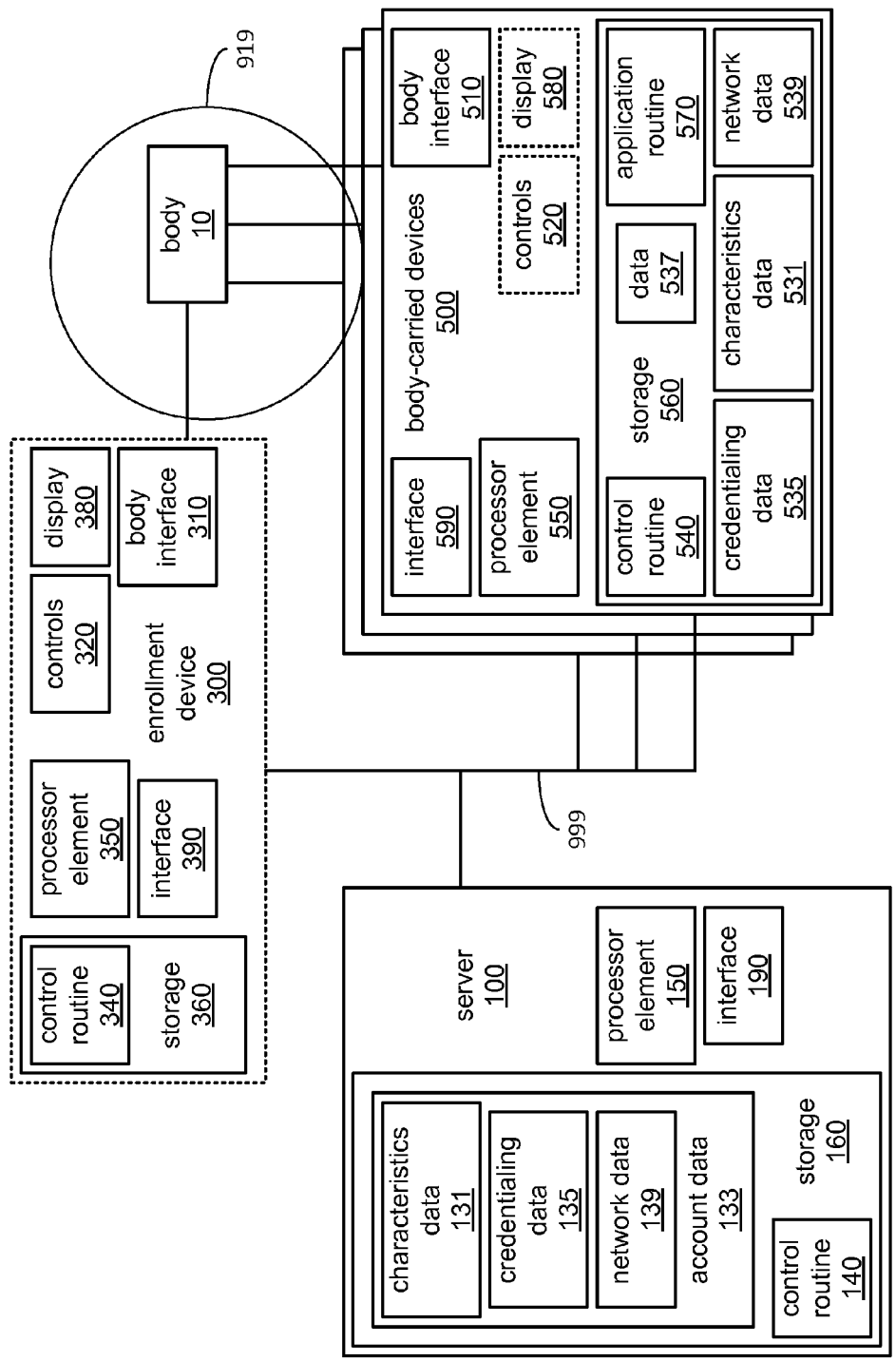
FIG. 1 illustrates an embodiment of a secure communications system.

Various embodiments are generally directed to techniques to form and maintain secure communications among two or more body-carried devices disposed in close proximity to the body of a person to form a body area network (BAN). More specifically, security test signals are recurringly exchanged between two or more body-carried devices through a body used as a communications medium to check bioelectric characteristics of the body to confirm the identity of the body. Changes in biometric characteristics that occur over time within a predetermined rate of change are recurringly adapted to, while changes occurring at too great a rate are responded to by presenting a security challenge to use a different mechanism to verify the identity of the body.

Body-carried devices of a BAN exchange security test signals of known signal characteristics through one or more tissues of a body on a recurring basis to measure bioelectric characteristics of the one or more tissues to confirm that it is the body of a person authorized to use the body-carried devices. Such known signal characteristics may include a known amplitude, a known combination of frequencies, a known pattern of frequency shift, a known data pattern, etc. Such bioelectric characteristics may include resistance, inductance and/or capacitance at one or more frequencies. In essence, tissues of a body subject the security test signals to a transform as they are conveyed through the body.

Such exchanges of signals to measure bioelectric characteristics may occur as part of an exchange of signals to exchange data. In other words, data may be exchanged in signals that are also analyzed as they are received to determine bioelectric characteristics. Alternatively or additionally, such exchanges of signals to measure bioelectric characteristics may occur independently of exchanges of signals to exchange data, and may occur randomly and/or at predetermined intervals. Each such body-carried device stores indications of known signal characteristics of the security test signals and of expected bioelectric characteristics of the body. Upon receipt, the signal characteristics of the received security test signals are compared to their known characteristics to derive bioelectric characteristics that are then compared to the expected bioelectric characteristics to determine if there is a match.

In some embodiments, differences in bioelectric characteristics of tissues may be found in different parts of a single body. In other words, body-carried devices communicating through one portion of a body may encounter bioelectric characteristics between their locations on the body that differ from such characteristics encountered by two other such devices communicating between two other locations on the same body. Therefore, in some embodiments, each such body-carried device may store characteristics data that indicates different expected bioelectric characteristics, each associated with communications to or from a different location at which a body-carried device may be disposed on the body. For example, one body-carried device may expect to encounter different bioelectric characteristics in its communications with another body-carried device depending on which limb of the body that other body-carried device is disposed at.

In various embodiments, bioelectric characteristics of tissues of a body may change over both shorter and longer periods of time. By way of example, levels of hydration of a body may change throughout an hour or a day as a person engages in any of a variety of activities, rests, eats, drinks, changes emotional state, enters into hotter or cooler environments, enters into dryer or more humid environments, takes a shower, etc. Also by way of example, skin tissue and its coupling to subcutaneous tissues are known to undergo considerable change throughout a lifetime as part of aging. As recognizable to those skilled in the art, such bodily changes are apt to cause changes in bioelectric characteristics encountered in communications between bodied-carried devices, at least for some frequencies at which signals may be exchanged. Therefore, in some embodiments, changes in bioelectric characteristics not exceeding a predetermined rate of change over time may be adapted to. More specifically, characteristics data stored in body-carried devices that includes indications of expected bioelectric characteristics may be allowed to be updated over time, and such updating may be conditioned on those bioelectric characteristics changing at a rate that does not exceed a predetermined threshold rate of change.

Where a sufficiently large change in bioelectric characteristics is detected within a sufficiently short period of time as to exceed the predetermined rate of change, one or more body-carried devices associated with a BAN may present a security challenge. Such a security challenge may include a requirement that a specified action be taken to verify the identity of the body to which the one or more body-carried devices are in close proximity. By way of example, a request for a password, fingerprint, etc. may be audibly or visually presented by one or more body-carried devices. By way of another example in which a body-carried device may be disposed at a different location on the body from where it has been previously disposed, a request may be presented to move the body-carried device so it is disposed at a location at which it was previously disposed to enable new testing of bioelectric characteristics at that location.

Body-carried devices may be enrolled to become part of a BAN, in part, by being supplied with characteristics data indicating expected bioelectric characteristics of a particular body, network data indicating identities of other body-carried devices already enrolled in the BAN, and/or credentialing data to enable encryption and/or other security measures. Such supplying of data may be performed by a server storing such data as part of an account data of an account associated with the BAN. Enrollment of a body-carried device may entail use of an enrollment device that is disposed at one or more locations of the body to transmit security test signals for receipt by the body-carried device to generate one or more initial indications of expected bioelectric characteristics for storage in the body-carried device and/or such a server.

With general reference to notations and nomenclature used herein, portions of the detailed description which follows may be presented in terms of program procedures executed on a computer or network of computers. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatus may be specially constructed for the required purpose or may include a general purpose computer. The required structure for a variety of these machines will be apparent from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

FIG. 1 is a block diagram of an embodiment of a secure communications system 1000 incorporating one or more of a server 100, a enrollment device 300, and one or more body-carried devices 500. Each of these computing devices 100, 300 and 500 may be any of a variety of types of computing device, including without limitation, a desktop computer system, a data entry terminal, a laptop computer, a netbook computer, a tablet computer, a handheld personal data assistant, a smartphone, a digital camera, a body-worn computing device incorporated into clothing, a computing device integrated into a vehicle (e.g., a car, a bicycle, a wheelchair, etc.), a server, a cluster of servers, a server farm, etc.

As depicted, one or more of these computing devices 100, 300 and 500 exchange signals associated with establishing secure communications among multiple ones of the body-carried devices 500 through one or both of a network 999 and a body area network (BAN) 919. However, one or more of these computing devices may exchange other data entirely unrelated to secure communications with each other and/or with still other computing devices (not shown) via either the network 999 or the BAN 919. In various embodiments, the network 999 may be a single network possibly limited to extending within a single building or other relatively limited area, a combination of connected networks possibly extending a considerable distance, and/or may include the Internet. Thus, the network 999 may be based on any of a variety (or combination) of communications technologies by which signals may be exchanged, including without limitation, wired technologies employing electrically and/or optically conductive cabling, and wireless technologies employing infrared, radio frequency or other forms of wireless transmission.

In various embodiments, each of the body-carried devices 500 incorporates one or more of a processor component 550, a storage 560, controls 520, a display 580 and an interface 590 to couple the body-carried devices 500 to the network 999. Each of the body-carried devices 500 also incorporates a body interface 510 to transmit and/or receive signals conducted through tissues of a body 10 employed as the communications medium of the BAN 919. The storage 560 stores one or more of a control routine 540, characteristics data 531, credentialing data 535, network data 539, an application routine 570 and data 537.

The body interface 510 may employ any of a variety of technologies to transmit and/or receive signals through at least skin tissue of the body 10. By way of example, the body interface 510 may employ direct electrically conductive contact (e.g., a conductive surface) with the skin of the body 10 to transmit and/or receive signals through at least the skin tissue (e.g., a "skin effect" for alternating current components of the signals). Capacitive components may be employed in the body interface 510 to avoid direct current (DC) coupling to the body 10. By way of another example, the body interface 510 may employ one or more plates or coils positioned in close proximity to, but not in conductive contact with, the skin of the body 10 to electromagnetically induce signals in at least the skin tissue and/or subcutaneous tissues. Such induction of signals may be accomplished through one or more layers of clothing, allowing at least the body interface 510 to be positioned overlying clothes, in a pocket, in baggage carried in close proximity to a body (e.g., a "fanny pack" or backpack), etc.

Such a conductive surface, plate or coil may be incorporated into a casing of one or more of the body-carried devices 500 and/or into the controls 520. More precisely, the body interface 510 may incorporate a conductive surface formed on an exterior surface of a casing or of a manually operable knob, lever, touch-sensitive surface, keycaps of keys of a keypad or keyboard, etc. of the controls 520 to be put into physical contact with at least skin tissue. Alternatively or additionally, the body interface 510 may incorporate a plate or coil incorporated within a casing or within a manually-operable knob, lever, touch-sensitive surface, keycaps of keys of a keypad or keyboard, etc. of the controls to sense and/or generate an electromagnetic field. Therefore, it should be understood that "disposed at a location" of a body, or similar words to that effect, are to be interpreted as denoting carried on a body (or otherwise brought into close proximity to a body) either in contact with the skin to achieve conductive contact or close enough to the skin to allow induction of signals (e.g., separated by one or more layers of clothing) at that location of the body.

As familiar to those skilled in the art, various ranges of frequencies of signals are more or less readily conducted by and/or through some portions of a body versus others, and the selection of frequencies that are more readily conducted may depend on the technologies employed in exchanging signals. Thus, disposing of one of the body-carried devices 500 at a location of the body 10 entails placing at least the body interface 510 either in conductive contact with the skin of the body 10 or in close proximity to the skin of the body 10 at that location.

The control routine 540 incorporates a sequence of instructions operative on the processor component 550 in its role as a main processor component of one of the body-carried devices 500 to implement logic to perform various functions. In executing the control routine 540, the processor component 550 operates the body interface 510 to transmit and/or receive signals through the body 10. These signals may convey the data 537 between the body-carried device 500 and at least one other device (e.g., another of the body-carried devices 500) through the body 10. The data 537 may be any of a variety of types of data, including and not limited to, text, graphics, photos, statistical data, biometric data concerning the body 10, audio, motion video, etc. The application routine 570 may be any of a variety of types of application routine, including and not limited to, a text or email client, a website browser, a health monitor, an audio and/or visual player, a photo viewer, etc. Whatever the function of the application routine 570 may be, the data 537 may be associated with the application routine 570, and proper functioning of the application routine 570 may entail transmitting and/or receiving the data 537 to and/or from another device through the body 10.

The exchange of signals through the body 10, including signals that may convey the data 537, avoids the security pitfalls of exchanging wireless radio frequency (RF) signals inasmuch as signals conveyed through the body 10 are not able to be wirelessly intercepted at a distance from the body 10. However, as has been discussed, situations do occur in which persons do come into close proximity to each other such that even signals conveyed through the body 10 of one person could be intercepted by a device carried by another person that is surreptitiously positioned in close proximity to the body 10. Various security measures or combinations of security measures may be employed to address this issue.

As one such security measure, indicators of the identities of devices (e.g., one or more of the body-carried devices 500) authorized to become part of the BAN 919 may be stored in the network data 539. Further, signals exchanged among devices of the BAN 919 (e.g., among the body-carried devices 500) may be required to include indications of the identities of the devices that transmit them to allow receiving ones of the body-carried devices 500 to compare those identities to the network data 539.

As another such security measure, security credentials of the credentialing data 535 may be employed to encrypt and/or otherwise restrict exchanges of signals in ways familiar to those skilled in the art. More specifically, the credentialing data 535 may include any of a variety of keys, ciphers, hashes, certificates, etc. employed either to encrypt/decrypt the data 537 or to verify another device (e.g., another of the body-carried devices 500) before exchanges of signals to convey the data 537 occur.

As still another such security measure, the processor component 550 may operate the body interface 510 to transmit and/or receive security test signals through the body 10. More precisely, the processor component 550 of one of the body-carried devices 500 may transmit security test signals and/or the processor component 550 of another of the body-carried devices 500 may receive and analyze those security test signals. Exchanges of security test signals may be performed as part of the exchanges of signals to exchange data with other devices such that the signals exchanged to convey the data 537 may also serve as security test signals. Alternatively or additionally, exchanges of security test signals may occur at times when signals to convey the data 537 are not exchanged, may occur at randomly selected times and/or may occur at regular intervals.

The security test signals, as transmitted, have known signal characteristics to enable the one of the body-carried devices 500 that receives the security test signals to compare the signal characteristics of the security test signals as received to the known signal characteristics. The known characteristics may include one or more known data patterns, known timings, known patterns of frequency shifts, known amplitudes, known modulations, known combinations of transmission frequencies, etc. In analyzing the security test signals as received in comparison to known characteristics, the processor component 550 of the one of the body-carried devices 500 that receives the security test signals is able to derive bioelectric characteristics of tissues in at least the portion(s) of the body 10 between that one of the body-carried devices 500 and whatever other device that transmitted them the security test signals. The processor component 550 then compares the derived bioelectric characteristics to the expected bioelectric characteristics indicated by the characteristics data 531 to determine if the bioelectric characteristics match within a predetermined threshold supporting a determination of there being a match.

As familiar to those skilled in the art, the change in signal characteristics of a security test signal from its transmission into the body 10 to its reception from the body 10 arise from tissues of the body 10 subjecting the security test signal to a transform. Numerous ones of the variety of signal characteristics enumerated above may be altered by that transform, and the derived bioelectric characteristics from comparisons of signal characteristics to known signal characteristics provide an indication and/or representation of that transform. Thus, the subsequent comparison of derived bioelectric characteristics to expected bioelectric characteristics is effectively a comparison of a derived transform to a known transform. Indeed, in some embodiments, the derivation of bioelectric characteristics from a comparison of signal characteristics to known signal characteristics may entail deriving a transform that is then compared to an expected transform to verify the identity of the body 10.

Such use of security test signals and matching of bioelectric characteristics is based on the inherent differences in bioelectric characteristics of the tissues of the body of each person, just as there are also differences in shape, size, weight, etc. between the bodies of different people. As a result of these differences in bioelectric characteristics between people, signals exchanged through the bodies of different people are subjected to different transforms that affect the signal characteristics of those signals in different ways and/or to differing degrees that may be relied upon to identify a person. Thus, if security test signals are received that demonstrate bioelectric characteristics that are deemed a match to bioelectric characteristics of the body of a particular person, then the received security test signals are deemed to provide verification that the one of the body-carried devices 500 that received those signals must be in close proximity to the body of that particular person. Such verification serves as an assurance that the one of the body-carried devices 500 that received the security test signals is not currently in close proximity (e.g., being held in the hands of) the body of a different person not authorized to operate it. More particularly, such verification may be employed as a condition in determining whether or not the processor component 550 will transmit the data 537 to another device, or refrain from doing so.

Such verification additionally serves as an assurance that the body of the particular person who is authorized to operate the one of the body-carried devices 500 that receives the security test signals is not in conductive contact with another body such that signals may be undesirably conveyed between them. As familiar to those skilled in the art, physical contact between two bodies results in electrical conductivity between them at the point of contact, and such an electrical coupling of one body to another can change at least some bioelectric characteristics of both bodies. Thus, if security test signals are received that demonstrate bioelectric characteristics that are deemed a match to bioelectric characteristics of the body of a particular person, then the received security test signals are deemed to provide verification that the body of that particular person is not in conductive contact with the body of another person. In essence, such verification provides assurance that the transmission medium, e.g., the body 10, is secure to the extent that it is not conductively coupled to another body.

However, as familiar to those skilled in the art, the bioelectric characteristics of the body 10 are apt to vary over time. There can easily be shorter term changes throughout the day arising from such factors as perspiration on the surface of the skin and changes in volume of blood flow through capillaries within the skin tissue and/or subcutaneous tissues. Shorter term changes can be easily caused by changes in emotions, physical exertion, hydration level, nutrition, environmental temperature, environmental humidity, etc. Also, specific activities such as eating, drinking, sleeping, taking a shower or bath, etc. can also cause shorter term changes. There are also longer term changes arising from changes in bioelectric characteristics of tissues due to aging. To accommodate such a lack of constancy in bioelectric characteristics, the processor component 550 may update the indications of bioelectric characteristics in the bioelectric characteristics data 531 over time as those characteristics change. The processor component 550 may compare a rate of change detected in the bioelectric characteristics observed in analyzing received security test signals over time to a predetermined rate of change in bioelectric characteristics. Doing so may distinguish changes arising from changes in bioelectric characteristics expected to occur in the body 10 throughout a day and/or throughout a lifetime from changes in bioelectric characteristics arising from the body-carried device 500 being disposed on a different body or arising from the body 10 being in conductive contact with another body.

Figure 2:
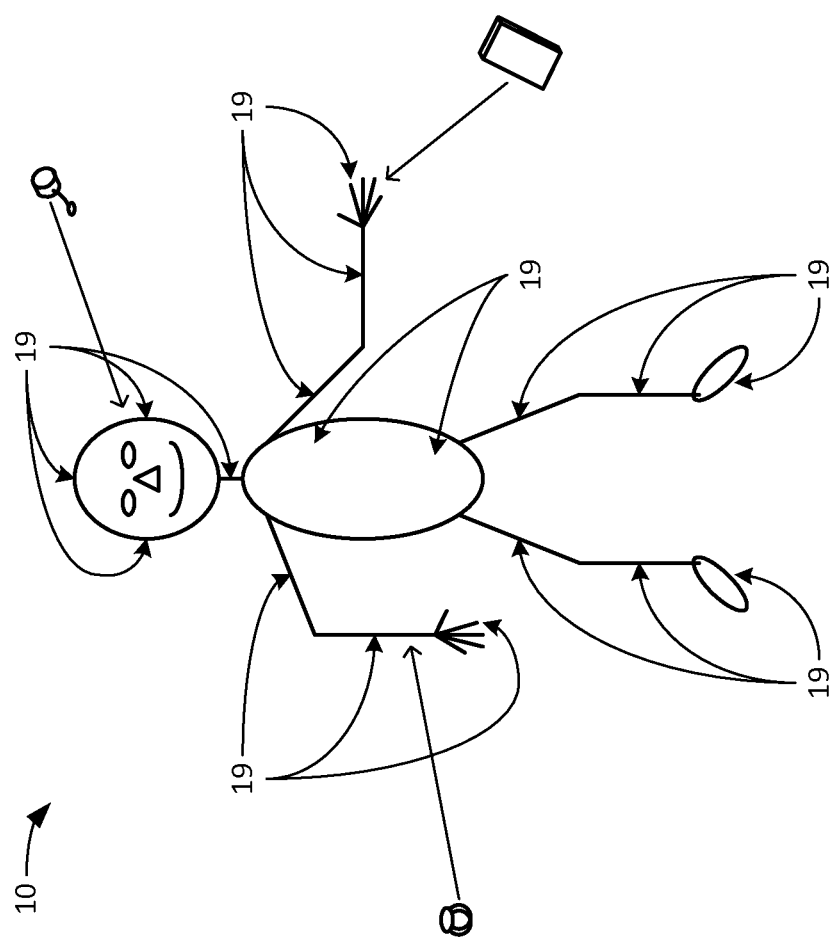
FIG. 2 illustrates example positions on a body at which body-carried devices may be disposed according to an embodiment.

As also familiar to those skilled in the art, the bioelectric characteristics of tissues of the body 10 may differ between different portions of the body 10. As a result, the bioelectric characteristics observed in an exchange of signals between two of the body-carried devices 500 may change if one or both of them are moved from being disposed at one portion of the body 10 to being disposed at another portion. FIG. 2 illustrates various example locations 19 on the body 10 at which various ones of the body-carried devices 500 may be disposed. For example, where a particular person invariably positions one of the body-carried devices 500 (e.g., a wrist watch) at the same wrist and positions another of the body-carried devices 500 (e.g., a wireless communications earset) at the same ear, there are no changes in bioelectric characteristics of signals exchanged between them arising from changes in locations. Under such circumstances, changes in such bioelectric characteristics detected in the receipt of security test signals are more likely to be attributable either to attempted security breaches or to the variations in bioelectric characteristics expected to occur within the body 10 over time (as discussed just above).

However, where a particular person tends to change the location 19 on the body 10 at which one of the body-carried devices 500 is disposed, the processor component 550 of that one of the body-carried devices 500 may frequently detect changes in bioelectric characteristics in the signals it receives. Additionally, the processor component 550 of one or more others of the body-carried devices 500 that are not moved among different locations 19 of the body 10 may still detect changes in bioelectric characteristics in signals received from the one of the body-carried devices 500 that is frequently moved. By way of example, although a person may invariably disposes one of the body-carried devices 500 (e.g., a wrist watch) at the same wrist, the processor component 550 of that body-carried device 500 may still encounter changes in bioelectric characteristics of signals received from another of the body-carried devices 500 each time that person switches from holding it in one hand to holding in the other (e.g., a handheld smart phone).

Returning to FIG. 1, to accommodate changes in bioelectric characteristics arising from such changes among the locations 19 of the body 10 at which one or more of the body-carried devices 500 may be disposed, the characteristics data 531 may include multiple indications of bioelectric characteristics. Each of such indications may specify bioelectric characteristics for a different combination of the locations 19 of the body 10 at which ones of the body-carried devices 500 that transmit and receive security test signals may be disposed. Thus, where one of the body-carried devices 500 tends to be disposed at the same location 19, while another is frequently moved between two others of the locations 19, the characteristics data 531 in each may have two separate indications of the bioelectric characteristics expected to be detected in signals exchanged between them. One of the indications may be of the bioelectric characteristics expected between the one unchanging location at which the one body-carried device 500 tends to be disposed and one of the two other locations 19 at which the other body-carried device 500 may be disposed. Correspondingly, the other of the indications may be of the bioelectric characteristics expected between that one unchanging location 19 and the other of the two locations 19 at which the other body-carried device 500 may be disposed.

In embodiments in which a security test signal is required to include an indication of the identity of the device that transmitted it (e.g., one of the body-carried devices 500), the different indications within the characteristics data 531 of different bioelectric characteristics associated with different locations 19 or combinations of locations 19 of the body 10 may be correlated to particular devices expected to be at those locations 19. Thus, the determination of a match between bioelectric characteristics encountered in received test signals and expected bioelectric characteristics indicated in the characteristics data 531 may also depend on whether the bioelectric characteristics associated with the received signal are among those indicated as possible for test signals received from a particular device.

Given the various aforedescribed factors that may influence whether a match is found between bioelectric characteristics encountered by a test signal and expected bioelectric characteristics indicated in the characteristics data 531, the processor component 550 may take various different actions in response to a determination that there is no match. In embodiments in which a test signal includes an indication of the identity of the device that transmit it, the processor component 550 may employ such an indication of identity to examine all indications in the characteristics data 531 that have an association with the identified device to attempt to find matching bioelectric characteristics associated with that device. If no such match is found, then the processor component 550 may present a security challenge to attempt to verify that the one of the body-carried devices 500 that received the test signal is disposed in close proximity to the body 10 of a person authorized to use it.

In embodiments in which the body-carried device 500 presenting the security challenge incorporates the controls 520 and the display 580, the processor component 550 may operate the display 580 to visually present a request for entry of a password as the security challenge. The processor component 550 may then monitor the controls 520 (e.g., a keyboard, touchpad, touch element of a touchscreen, etc.) to await entry of the requested password. If a correct password is entered, then the processor component 550 may add an indication of the bioelectric characteristics encountered with the received test signal to the characteristics data 531. This may be done based on a presumption that the newly encountered bioelectric characteristics have arisen as a result of the person having disposed one or more of the body-carried devices 500 at a different location 19 on the body 10 than before, and that the response should be adaptation to accept the newly encountered bioelectric characteristics.

In embodiments in which the body-carried device 500 lacks the controls 520, the display 580 and/or other components providing a capability to present a security challenge requiring entry of information (e.g., a password), the body-carried device 500 may operate a simpler component (e.g., a single light-emitting diode, etc.) to more simply present a security challenge. The security challenge may be to position the body-carried device 500 at a location 19 at which the body-carried device 500 has previously been used to allow it to receive further test signals from one or more other devices that are presumably disposed at locations 19 at which they have also previously been used. The intent is to enable the body-carried device 500 to receive test signals from one or more other devices of the BAN 919 that will encounter bioelectric characteristics that match expected bioelectric characteristics such that there will be confirmation that the body-carried device 500 is disposed at a location on the body 10 of a person authorized to use it. If such a match is found upon receipt of such test signals, then the processor component 550 of the body-carried device 500 may then present an indication that it can be moved back to whatever new location 19 at which the lack of a match occurred. The processor component 550 also adds an indication of the bioelectric characteristics for which no match was found to the characteristics data 531. This type of security challenge may be employed as a mechanism to enable adaptation of a one of the body-carried devices 500 that incorporates minimal capability to provide a user interface.

In various embodiments, the server 100 incorporates one or more of a processor component 150, a storage 160 and an interface 190 to couple the server 100 to the network 999. The storage 160 stores one or more of a control routine 140 and account data 133. The account data 133 includes one or more of a characteristics data 131, a credentialing data 135 and a network data 139. The control routine 140 incorporates a sequence of instructions operative on the processor component 150 in its role as a main processor component of the server 100 to implement logic to perform various functions.

In executing the control routine 140, the processor component 150 may operate the interface 190 to enable communications with each of the body-carried devices 500 via the network 999 to provide device enrollment services to enable "pairing" operations in which the body-carried devices 500 are caused to cooperate to form the BAN 919. As familiar to those skilled in the art, such device pairing entails providing each device of a relatively small network (e.g., the BAN 919) with information concerning the other devices, including security credentials and/or identifiers, to enable those devices to recognize each other and interact with each other in that network.

To make use of such services provided by the server 100, one or more of the body-carried devices 500 may be operated to contact the server 100 via the network 999 to receive at least portions of one or more of the characteristics data 531, the credentialing data 535 and the network data 539. One or more of the characteristics data 131, credentialing data 135 and the network data 139 stored in the storage 160 of the server 100 may include a superset of the information included in the characteristics data 531, the credentialing data 535 and the network data 539, respectively, stored in the storage 560 of each of the body-carried devices 500. During enrollment, the processor component 150 may retrieve at least a portion of one or more of the characteristics data 131, the credentialing data 135 and the network data 139, and transmit what is retrieved to one or more of the body-carried devices 500. As each of the body-carried devices 500 is added to those that are already enrolled in the BAN 919, an indication of its identity is added to the network data 139, and the processor component 150 subsequently provides an indication of its identity to the others of the body-carried devices 500 that are already enrolled as an update to the network data 539 that each stores.

Further, as the characteristics data 531 of one or more of the body-carried devices 500 is updated through adaptation (as described above), the processor component 550 of one or more of the body-carried devices 500 may transmit indications of those updates to the server 100, enabling the processor component 150 to augment the characteristics data 131 with those updates. The server 100 may then redistribute those updates to others of the body-carried devices 500 via the network 999. Alternatively or additionally, one or more of the body-carried devices 500 may directly exchange indications of such updates through the BAN 919. In some embodiments, one of the body-carried devices 500 may aggregate updates to the characteristics data 531 made by multiple ones of the body-carried devices 500 and transmit indications of those updates to the server 100 on their behalf. Again, such updates to the characteristics data 531 may arise as a result of adaptation to changes in bioelectric characteristics of tissues of the body 10 over time. Alternatively or additionally, such updates may arise as a result of one or more of the body-carried devices 500 being disposed at a new location 19 such that indications of newly encountered bioelectric characteristics are added to the characteristics data 531 to support exchanges of signals to and from such ones of the body-carried devices 500 as are disposed at such new locations.

In various embodiments, the enrollment device 300 (if present) incorporates one or more of a processor component 350, a storage 360, controls 320, a display 380 and an interface 390 to couple the enrollment device 300 to the network 999. The storage 360 stores a control routine 340. Like each of the body-carried devices 500, the enrollment device 300 also incorporates a body interface 310. The control routine 340 incorporates a sequence of instructions operative on the processor component 350 in its role as a main processor component of the enrollment device 300 to implement logic to perform various functions.

In executing the control routine 340, the processor component 350 may operate the interface 390 to communicate with the server 100 to assist the server 100 in enrolling one of the body-carried devices 500. It is envisioned that the enrollment device 300 may be located at a point of sale of one of the body-carried devices 500 and/or at another location (e.g., a kiosk). The processor component 350 may employ the controls 320 and the display 380 to present a user interface through which the processor component 350 presents guidance through various steps to enroll one of the body-carried devices 500 with the server 100 to add it to an account associated with the account data 133, and thereby enroll it to join the BAN 919.

Where the one of the body-carried devices 500 is purchased to be added to others of the body-carried devices 500 already enrolled in the BAN 919, the processor component 350 may operate the display 380 and the controls 320, and may cooperate with the server 100 through the network 999 to add the newly purchased one of the body-carried devices 500 to the account. In so doing, an indication of the identity of the newly purchased body-carried device 500 may be supplied to the server 100 through the enrollment device 300, and added to the network data 139 in preparation for being subsequently relayed to others of the body-carried devices 500. Further, as previously discussed, the newly purchased one of the body-carried devices 500 may then be supplied with the characteristics data 531, the credentialing data 535 and/or the network data 539 that it stores in its storage 560 by the server 100.

Where the first of the body-carried devices 500 to be used to form the network 919 is purchased, the processor component 350 may operate the display 380 and the controls 320, and may cooperate with the server 100 through the network 999 to enable creation of the account associated with the account data 133, as well as generate the account data 133. In so doing, an indication of the identity of the newly purchased body-carried device 500 may be supplied to the server 100 through the enrollment device 300, and stored as the network data 139. The processor component 350 may then visually present on the display 380 instructions to dispose the newly purchased one of the body-carried devices 500 at a location 19 of the body 10 at which it will be used, and to dispose at least the body interface 310 of the enrollment device 300 at one or more locations 19 at which others of the body-carried devices 500 will be used. The processor component 350 may then operate the body interface 310 to generate security test signals at those one or more locations 19 to enable those signals to be received at the location 19 at which the newly purchased body-carried device 500 will be used to enable receipt of those signals at that location by the newly purchased body-carried device 500. Upon receiving those security test signals at that location 19, the processor component 550 of the newly purchased one of the body-carried devices 500 analyzes the received signals to determine how their signal characteristics have been changed by passage through the body 10 from each of the other locations to derive bioelectric characteristics of the body 10 associated with each of those other locations. The processor component 550 then stores those indications of those derived bioelectric characteristics in the characteristics data 531, thereby creating indications of expected bioelectric characteristics in the characteristics data 531 for later use in matching.

It should be noted that it is envisioned that each of the body-carried devices 500, despite being capable of being coupled to the network 999, may only be intended to be coupled to the network 999 for purposes of enrollment to join the BAN 919 and/or to enable further configuration of their functionality within the BAN 919, including exchanging data with the server 100. It is envisioned that, during normal operation, one or more of the body-carried devices 500 may be restricted to communicating with other devices (e.g., others of the body-carried devices 500) via the BAN 919 following their enrollment to become part of the BAN 919.

Figure 3:
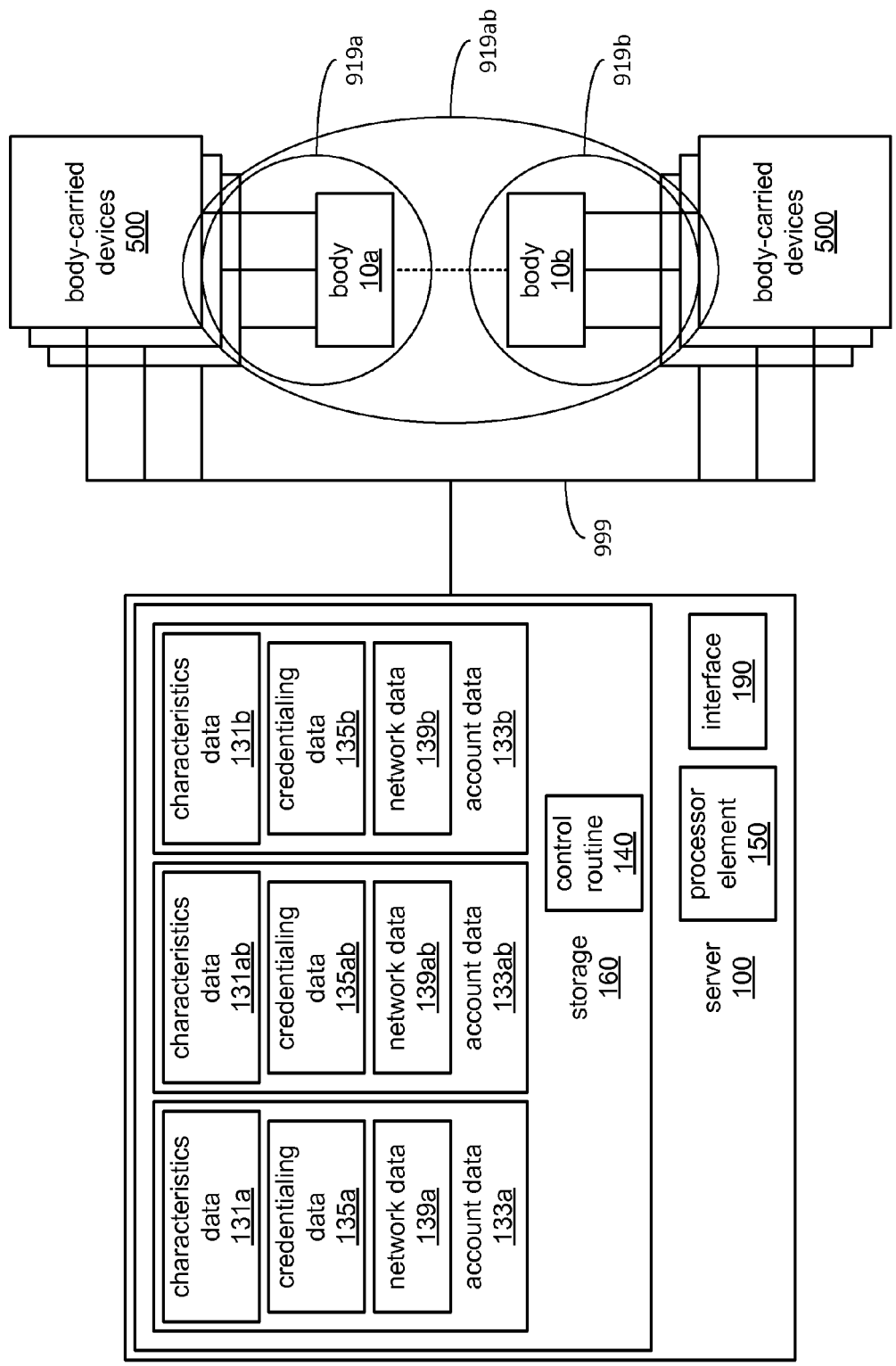
FIG. 3 illustrates an alternate embodiment of a secure communications system.

FIG. 3 illustrates a block diagram of an alternate embodiment of the secure communications system 1000 that includes more than one set of the body-carried devices 500 that form normally separate BANs 919a and 919b that may be momentarily combined to form a third BAN 919ab. The alternate embodiment of FIG. 3 is similar to the embodiment of FIG. 1 in many ways, and thus, like reference numerals are used to refer to like components throughout.

As with the BAN 919 of FIG. 1 that employed the body 10 as a communications medium, the BAN 919a of FIG. 3 employs a body 10a as a communications medium and the BAN 919b of FIG. 3 employs a body 10b as a communications medium. The server 100 separately stores account data 133a and 133b that correspond to the BANs 919a and 919b, respectively, in a manner very much akin to the storage of account data 133 corresponding to the BAN 919 in FIG. 1. Thus, each of the BANs 919a and 919b may be regarded as an instance of the BAN 919 of FIG. 1. Further, although not specifically depicted in FIG. 3, the embodiment of the secure communications system 1000 of FIG. 3 may additionally include the enrollment device 300 to enroll one or more of the body-carried devices 500 associated with either of the BANs 919a or 919b in a manner substantially similar to what was described with regard to the embodiment of FIG. 1.

Figure 4:
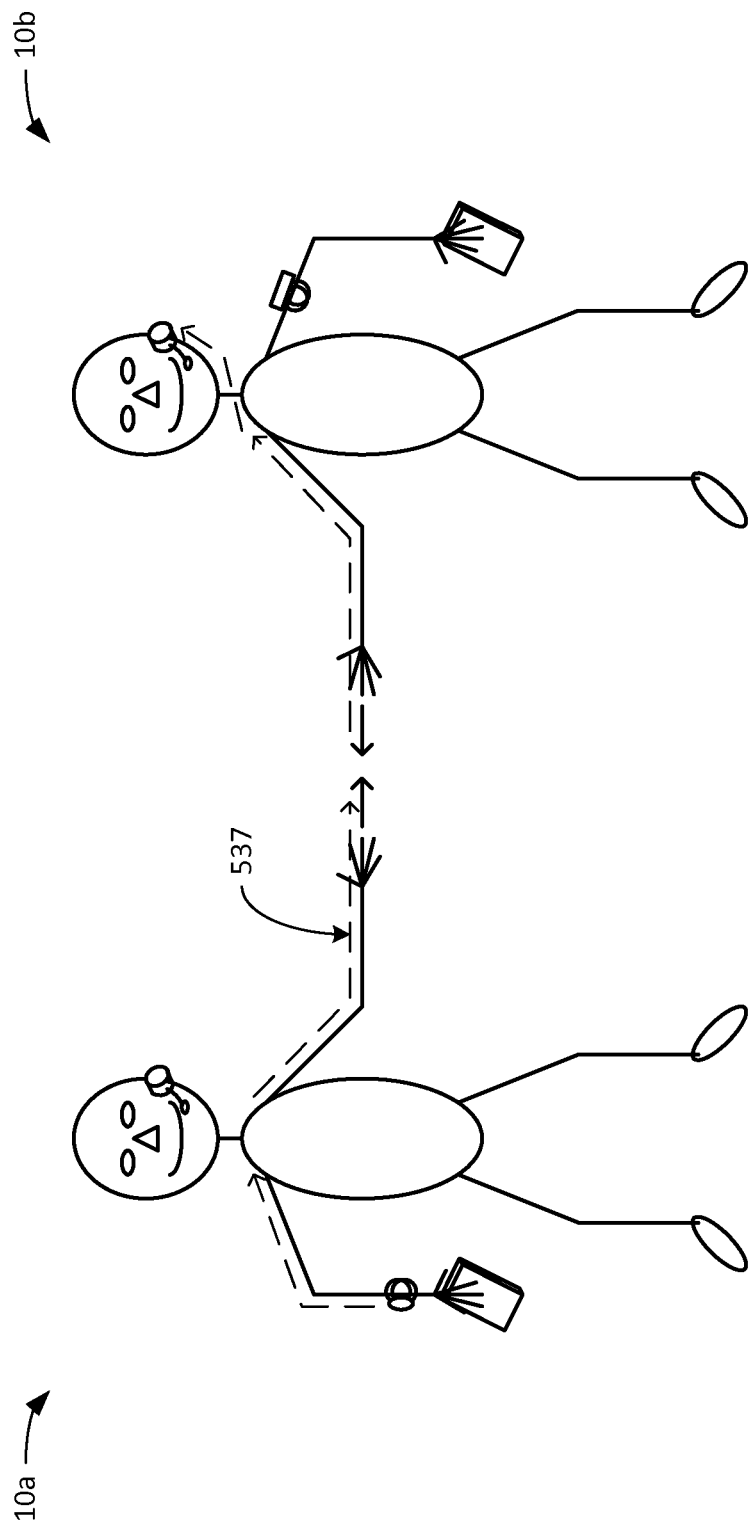
FIG. 4 illustrates an example of two body area networks being momentarily combined according to an embodiment.

However, as also depicted in FIG. 3, the server 100 additionally stores account data 133ab associated with the combined BAN 919ab that may be momentarily formed as a result of conductive contact between the bodies 10a and 10b. FIG. 4 illustrates an example of such contact that may lead to the momentary formation of the BAN 919ab. It may be desired to occasionally form the BAN 919ab to exchange data between ones of the body-carried devices 500 of each of the separate BANs 919a and 919b. By way of example, the bodies 10a and 10b may be of co-workers who occasionally need to share information on aspects of a common project. Each may carry updates to data and/or new data that they generate or gather over a period of time, and may wish to occasionally share such updates to data and/or new data with each other. The momentary formation of the BAN 919ab may provide a mechanism in which contact between the bodies 10a and 10b forms a common medium across which sharing of data may occur, as depicted in FIG. 4 with the example transmission of the data 537 between a body-carried device 500 disposed on the body 10a and a body-carried device 500 disposed on the body 10b.

Alternatively or additionally, it may be desired to occasionally form the BAN 919ab as a mechanism of confirming the presence of both of the bodies 10a and 10b in close proximity such that both are confirmed to be present in the same room or same other location as a precursor to a granting of authorization to access data and/or perform some other function. By way of example, access to a room, a device and/or sensitive data (not necessarily data stored in one of the body-carried devices 500) may require the presence of two individuals at the same location. This may be for safety reasons where one person is expected to oversee operation of equipment or performance of a hazardous task, for example, by another. Alternatively or additionally, this may be for security reasons where one person is expected to oversee handling of sensitive information by another, for example, to prevent theft of that information.

Returning to FIG. 3, as has been discussed, in each of the BANs 919a and 919b, ones of the body-carried devices 500 transmit and receive security test signals on a recurring basis to recurringly confirm that each of those body-carried devices 500 are in close proximity to (or in other words, disposed at locations of) the body of a person authorized to use them. Thus, the body-carried devices 500 of the BAN 919a are able to confirm their close proximity to the body 10a (presumably of a person authorized to use them), and the body-carried devices 500 of the BAN 919b are able to confirm their close proximity to the body 10b (presumably of a person authorized to use them). As a result, upon combining of the BANs 919a and 919b to momentarily form the BAN 919ab, one or more of the body-carried devices 500 of each of the BANs 919a and 919b are able to confirm their close proximity to the body of an authorized person to the to the body-carried devices 500 of the other of the BANs 919a and 919b through the two bodies 10a and 10b while those bodies are in contact.

However, as previously discussed, contact of one body with another body may change the bioelectric characteristics of both bodies, which can cause both of the BANs 919a and 919b to cease to function. Again, with the bioelectric characteristics of both bodies thusly changed, comparisons of bioelectric characteristics encountered by received security test signals within each of the BANs 919a and 919b to expected bioelectric characteristics indicated in the characteristics data 531 no longer result in matches. Indeed, as previously discussed, such comparisons of bioelectric characteristics are actually intended to detect instances in which a body has been put into conductive contact with another body to enable such situations to be responded to as potential security breaches, and to respond to the greatly changed bioelectric characteristics that result by refraining from transmitting data in order to preserve security. Thus, the act of momentarily combining the BANs 919a and 919b as part of providing an additional form of security may ironically be treated as an indication of a possible attempt at a security breach by the body-carried devices 500 of both of the BANs 919a and 919b.

Figure 5:
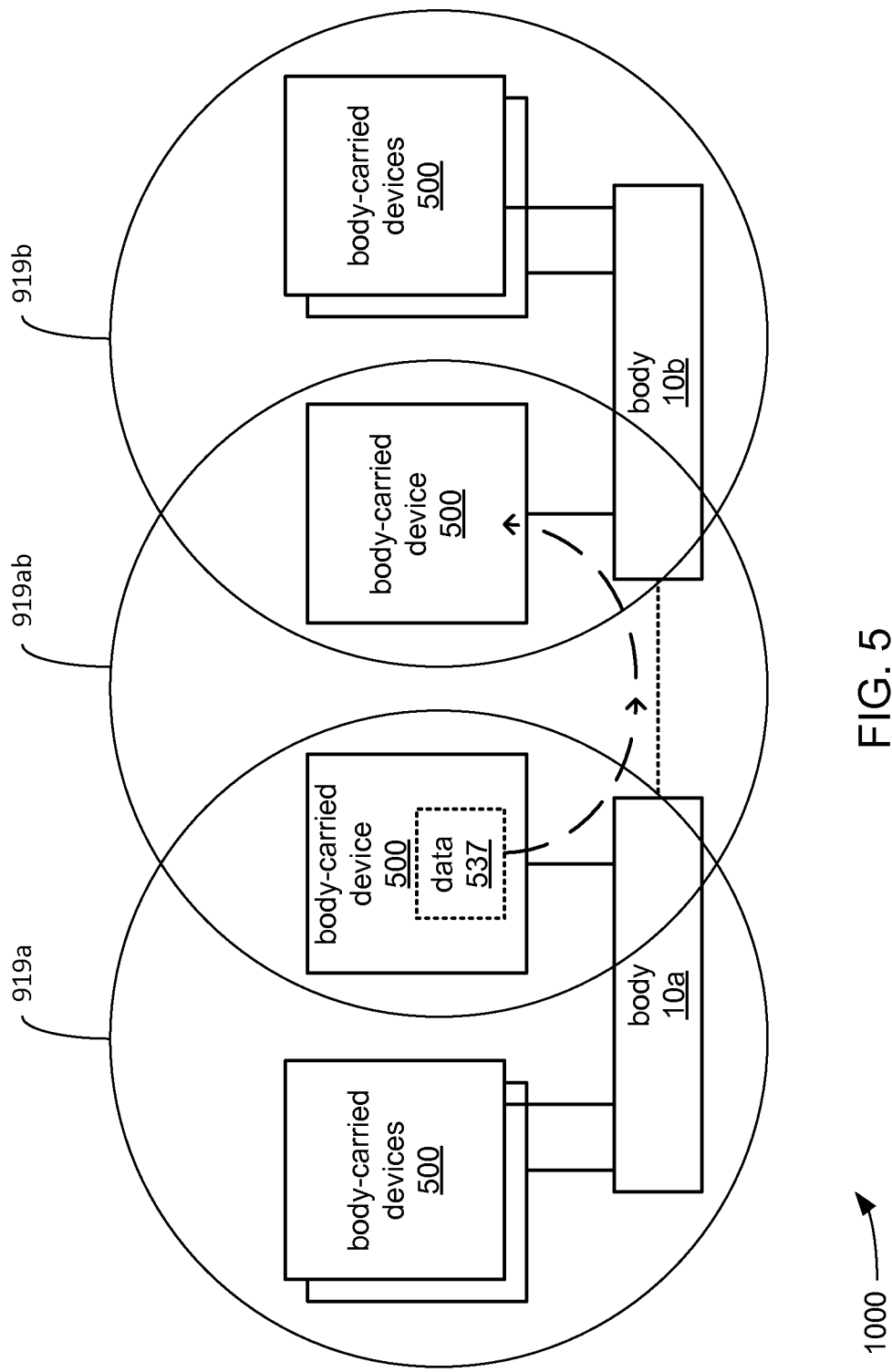
FIG. 5 illustrates an example of association of body-carried devices to a combined network according to an embodiment.

To overcome this effect on each of the BANs 919a and 919b, as well as to secure communications in the BAN 919ab created by such conductive contact of the bodies 10a and 10b, the server 100 maintains the account data 133ab for use by at least one of the body-carried devices 500 disposed at a location on each of the bodies 10a and 10b. As depicted, in a manner analogous to the account data 133a and 133b, the account data 133ab incorporates one or more of characteristics data 131ab, credentialing data 135ab and network data 139ab. FIG. 5 illustrates an example of enrollments of body-carried devices 500 to each of the BANs 919a, 919b and 919ab. As depicted, separate sets of multiple body-carried devices 500 are enrolled in each of the BANs 919a and 919b. As also depicted, it may be that only a subset of the body-carried devices 500 of each of the BANs 919a and 919b are also enrolled in the BAN 919ab, though it is also possible for all of the body-carried devices 500 of one or both of the BANs 919a and 919b to also be enrolled in the BAN 919ab.

Returning to FIG. 3, the characteristics data 131ab may include indications of bioelectric characteristics expected in signals received by body-carried devices 500 enrolled in either of the BANs 919a and 919b while the bodies 10a and 10b are in conductive contact, regardless of whether they are all also enrolled in the BAN 919ab. Thus, at least a portion of the characteristics data 131ab may be provided by the server 100 to all of the body-carried devices 500 of both the BANs 919a and 919b to augment the indications of expected bioelectric characteristics stored as the characteristics data 531 in the storages 560 in each of those body-carried devices 500. Again, this is to enable continued communications even between ones of the body-carried devices 500 that are enrolled only in one or the other of the BANs 919a or 919b, and not enrolled in the BAN 919ab.

The network data 139ab may include indications of identities of the ones of the body-carried devices 500 of the each of the BANs 919a and 919b that are enrolled in the BAN 919ab, and thus are to accept exchanges of signals with ones of the body-carried devices 500 of the other of the BANs 919a and 919b. Thus, at least a portion of the network data 139ab may be provided by the server 100 to those of the body-carried devices 500 that are enrolled in the BAN

919*ab*. In embodiments in which security credentials (e.g., keys, ciphers, hashes, certificates, etc.) are employed to encrypt or otherwise restrict sharing of data between ones of the body-carried devices 500, the credentialing data 135*ab* may include credentials to secure transfers of data between body-carried devices 500 enrolled in the BAN 919*ab*.

In various embodiments, each of the processor components 150, 350 and 550 may include any of a wide variety of commercially available processors. Further, one or more of these processor components may include multiple processors, a multi-threaded processor, a multi-core processor (whether the multiple cores coexist on the same or separate dies), and/or a multi-processor architecture of some other variety by which multiple physically separate processors are in some way linked.

In various embodiments, each of the storages 160, 360 and 560 may be based on any of a wide variety of information storage technologies, possibly including volatile technologies requiring the uninterrupted provision of electric power, and possibly including technologies entailing the use of machine-readable storage media that may or may not be removable. Thus, each of these storages may include any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may include multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

In various embodiments, each of the interfaces 190, 390 and 590 may employ any of a wide variety of signaling technologies enabling computing devices to be coupled to other devices as has been described. Each of these interfaces may include circuitry providing at least some of the requisite functionality to enable such coupling. However, each of these interfaces may also be at least partially implemented with sequences of instructions executed by corresponding ones of the processor components (e.g., to implement a protocol stack or other features). Where electrically and/or optically conductive cabling is employed, these interfaces may employ signaling and/or protocols conforming to any of a variety of industry standards, including without limitation, RS-232C, RS-422, USB, Ethernet (IEEE-802.3) or IEEE-1394. Where the use of wireless signal transmission is entailed, these interfaces may employ signaling and/or protocols conforming to any of a variety of industry standards, including without limitation, IEEE 802.11a, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1×RTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc.

Figure 6:
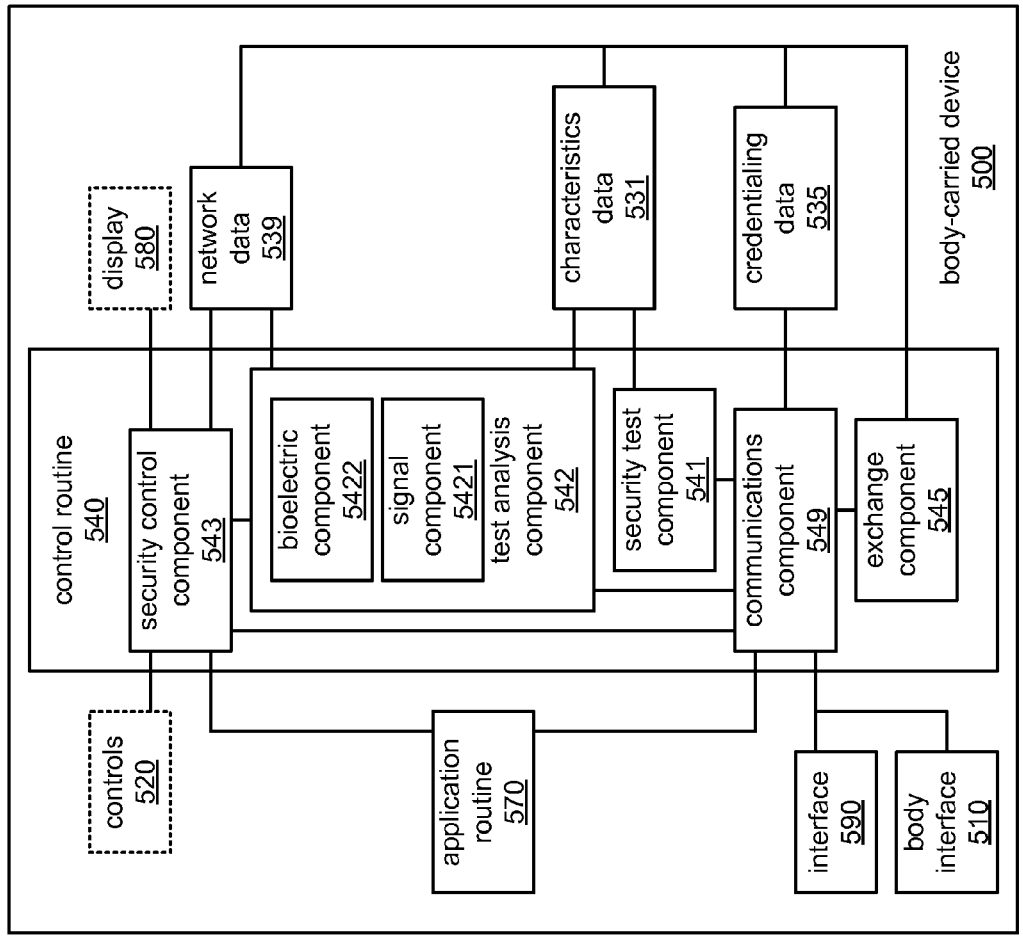
FIG. 6 illustrates a portion of an embodiment of a secure communications system.

FIG. 6 illustrates a block diagram of a portion of an embodiment of the secure communications system 1000 of either FIG. 1 or 3 in greater detail. More specifically, FIG. 4 depicts aspects of the operating environment of the body-carried device 500 in which the processor component 550, in executing the control routine 540, exchanges and analyzes security test signals to at least verify the identity of a body that the body-carried device 500 is disposed in close proximity to (or in other words, disposed at a location thereof).

As recognizable to those skilled in the art, the control routines 540, as well as the application routine 570, including the components of which each is composed, are selected to be operative on whatever type of processor or processors that are selected to implement the processor component 550. In various embodiments, each of these routines may include one or more of an operating system, device drivers and/or application-level routines (e.g., so-called "software suites" provided on disc media, "applets" obtained from a remote server, etc.). Where an operating system is included, the operating system may be any of a variety of available operating systems appropriate for the processor component 550. Where one or more device drivers are included, those device drivers may provide support for any of a variety of other components, whether hardware or software components, of the body-carried device 500.

The control routine 540 may include a communications component 549 executable by the processor component 550 to operate the body interface 510 and/or the interface 590 to transmit and receive signals via the BAN 919 and/or the network 999, respectively, as has been described. Among the signals exchanged may be security test signals among one or more of the body-carried devices 500 via the BAN 919. Alternatively or additionally, among the signals exchanged may be signals conveying data via the network 999 in support of enrolling one or more of the body-carried devices 500 in the BAN 919 and/or as part of updating data to maintain the BAN 919. As recognizable to those skilled in the art, these communications components are selected to be operable with whatever type of interface technology is selected to implement corresponding ones of the body interface 510 and the interface 590.

The control routine 540 may include an exchange component 545 executable by the processor component 550 to exchange at least portions of one or more of the characteristics data 531, the credentialing data 535 and the network data 539. The exchange component 545 may do so with the server 100 and/or with one or more others of the body-carried devices 500, and may do so through the interface 590 and/or through the body interface 510. Thus, either a BAN (such as one or more of the BANs 919*a*, 919*b* or 919*ab*) or another form of network (e.g., the network 999) may be employed by the exchange component 545 in such exchanges of data. As has been discussed, such exchanges of data may be in support of enrolling one or more of the body-carried devices 500 and/or may be to relay updates among the server 100 and/or one or more of the body-carried devices 500.

The control routine 540 may include a security test component 541 executable by the processor component 550 to transmit a security test signal through the body interface 510 and to one or more other devices (e.g., one or more of the body-carried devices 500) through a BAN (e.g., one of the BANs 919, 919a, 919b or 919ab). As previously discussed, the security test signals are transmitted onto a BAN with known signal characteristics. In some embodiments, an indication of the known signal characteristics may be stored as part of the characteristics data 531 for reference by at least the security test component 541. As also previously discussed, the security test component 541 may transmit the security test signal as part of a signal conveying data, or as an entirely separate signal transmitted randomly or at intervals.

The control routine 540 may include a test analysis component 542 executable by the processor component 550 to analyze security test signals as received by the body-carried device 500 to verify the identity of the body at which the body-carried device is disposed in close proximity (e.g., one of the bodies 10, 10a or 10b). As depicted, the test analysis component 542 may include a signal component 5421 to compare signal characteristics of security test signals as received to the known signal characteristics to derive the bioelectric characteristics encountered in the transmission of the security test signals through tissues of the body. As has been previously discussed, the difference between the known signal characteristics and those of the security test signals as received represent the results of bioelectric characteristics of tissues (e.g., the skin and/or subcutaneous tissues) of the body effecting a transform on the security test signals as they are conveyed through the body. Thus, the derived bioelectric characteristics are indicative of that transform. Again, an indication of the known signal characteristics may be stored as part of the characteristics data 531. As also depicted, the test analysis component 542 may include a bioelectric component 5422 to compare the bioelectric characteristics derived by the signal component 5421 to expected bioelectric characteristics to determine whether there is a match within a predetermined threshold of difference in bioelectric characteristics.

Where there is a match within the predetermined threshold, the test analysis component 542 may deem the body to which the body-carried device 500 is disposed in close proximity to be a body of a person authorized to use the body-carried device 500, and therefore, the body may be deemed a secure communications medium for the exchange of data therethrough. Indeed, in response to there being such a match, the test analysis component 542 may signal or otherwise cooperate with one or more other components of the body-carried device 500 to allow data (e.g., the data 537) to be transmitted through the BAN.

Where there isn't a match within the predetermined threshold, but the degree of difference is indicative of a rate of change in bioelectric characteristics that is within a predetermined maximum rate of change, the body may still be deemed a secure communications medium for the exchange of data therethrough. Further, the characteristics data 531 may be augmented to store an indication of the derived bioelectric characteristics therein as expected bioelectric characteristics for subsequent use in matching.

The control routine 540 may include a security control component 543 to take various actions in response to the results of comparisons of bioelectric characteristics derived by the signal component 5421 to expected bioelectric characteristics by the bioelectric component 5422. In response to a lack of a match, the security control component 543 may operate the display 580 (if present) to visually present a security challenge, such as a request for a password, as an alternate mechanism to verify that the body-carried device 500 is disposed in close proximity to the body of a person authorized to use it. The security control component 543 may then monitor the controls 520 (if present) to await the receipt of input via the controls 520 of a response to the security challenge (e.g., entry of the requested password). If there is a response to the security challenge that verifies that the body-carried device 500 is disposed in close proximity to the body of a person authorized to use it, then the security control component 543 may signal the test analysis component 542 (or a component thereof) to that effect. This may trigger storage of an indication of derived bioelectric characteristics that didn't match in the characteristics data 531 to augment the expected bioelectric characteristics for use in future matching.

The test analysis component 542 may correlate indications of what devices transmit the security test signals that the body-carried device 500 receives to particular ones of the expected bioelectric characteristics stored in the characteristics data 531. The bioelectric component 5422 may not deem a match to bioelectric characteristics derived by the signal component 5421 to have been found among the expected bioelectric characteristics of the characteristics data 531 unless the identity of the device that transmitted a security test signal matches the identity of a device associated with otherwise matching expected bioelectric characteristics. Thus, the test analysis component 542 may signal the security control component 543 when a match is found that is associated with a device (e.g., another body-carried device 500) that is disposed on another body. In response, in some embodiments, the security control component 543 may signal the application routine 570 that it is authorized to perform a function that required the body to which the body-carried device 500 is in close proximity be put in conductive contact with the other body.

Figure 7:
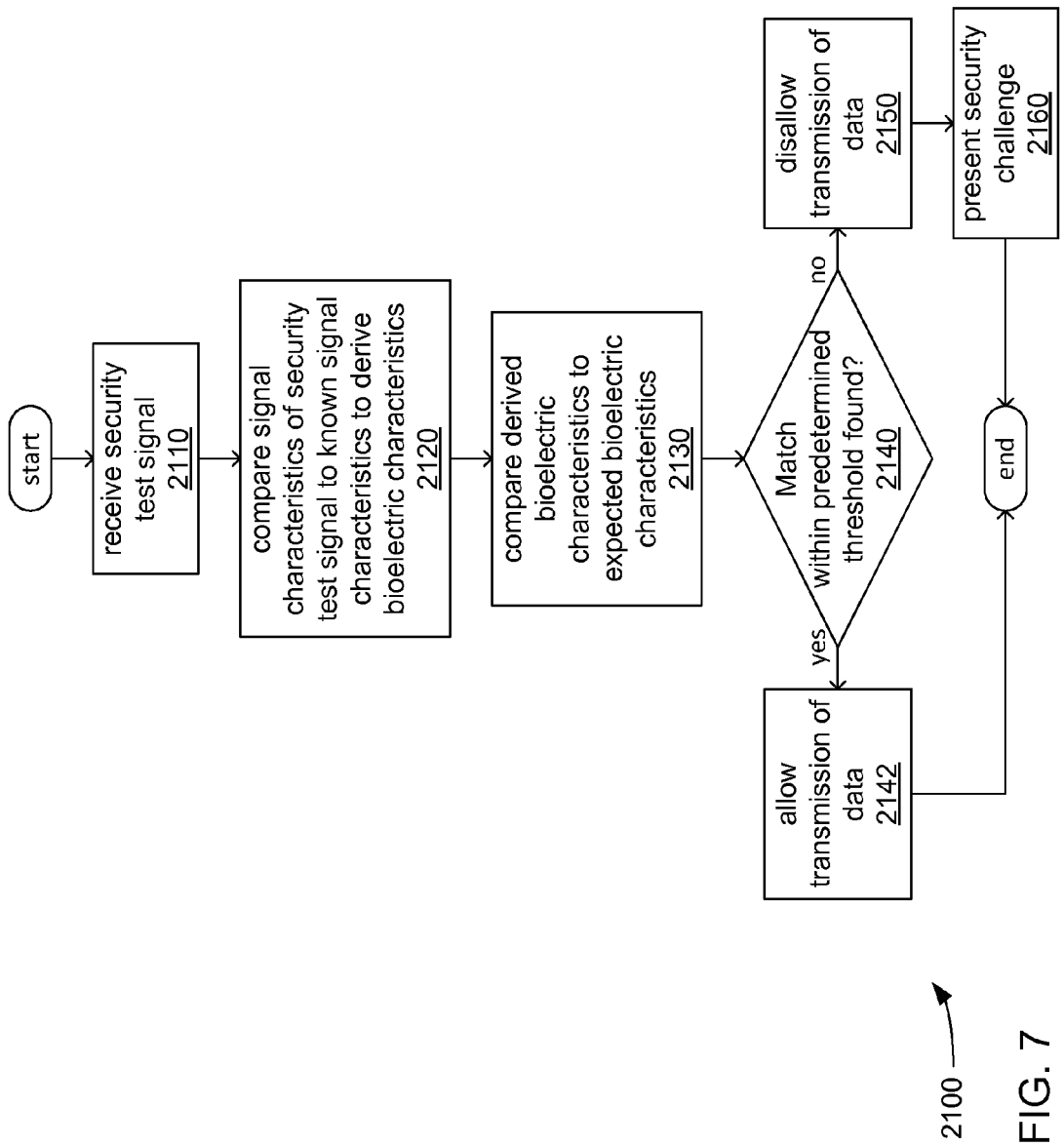
FIGS. 7-9 each illustrate a logic flow according to an embodiment.

FIG. 7 illustrates one embodiment of a logic flow 2100. The logic flow 2100 may be representative of some or all of the operations executed by one or more embodiments described herein. More specifically, the logic flow 2100 may illustrate operations performed by the processor component 550 in executing at least the control routine 540, and/or performed by other component(s) of one of the body-carried devices 500.

At 2110, a processor component of a body-carried device of a secure communications system (e.g., the processor component 550 of one of the body-carried devices 500 of the secure communications system 1000) receives a security test signal from a body of a BAN in which the body-carried device is enrolled (e.g., one of the BANs 919, 919a or 919b). At 2120, signal characteristics of the security test signal, as received by the body-carried device, are compared to the known signal characteristics of the security test signal as transmitted. As previously discussed, security test signals are transmitted with known signal characteristics, and may be transmitted either as part of signals to convey data or as entirely separate signals transmitted randomly or at intervals.

At 2130, the derived bioelectric characteristics are compared to one or more stored expected bioelectric characteristics to attempt to find a match within a predetermined threshold of difference in bioelectric characteristics. Again, the derived bioelectric characteristics represent a transform to which one or more tissues of the body subjected the received security test signal. If a match within that threshold is found at 2140, then a transmission of data by the body-carried device through the body is allowed to occur at 2142.

However, if no such match is found at 2140, then such a transmission of that data is disallowed at 2150. Instead, it is deemed possible that the body-carried device is no longer disposed in close proximity to the body of a person authorized to use it, and a security challenge is presented at 2160 to attempt to employ another mechanism to determine whether the body-carried device is in close proximity to such a body, or not.

Figure 8:
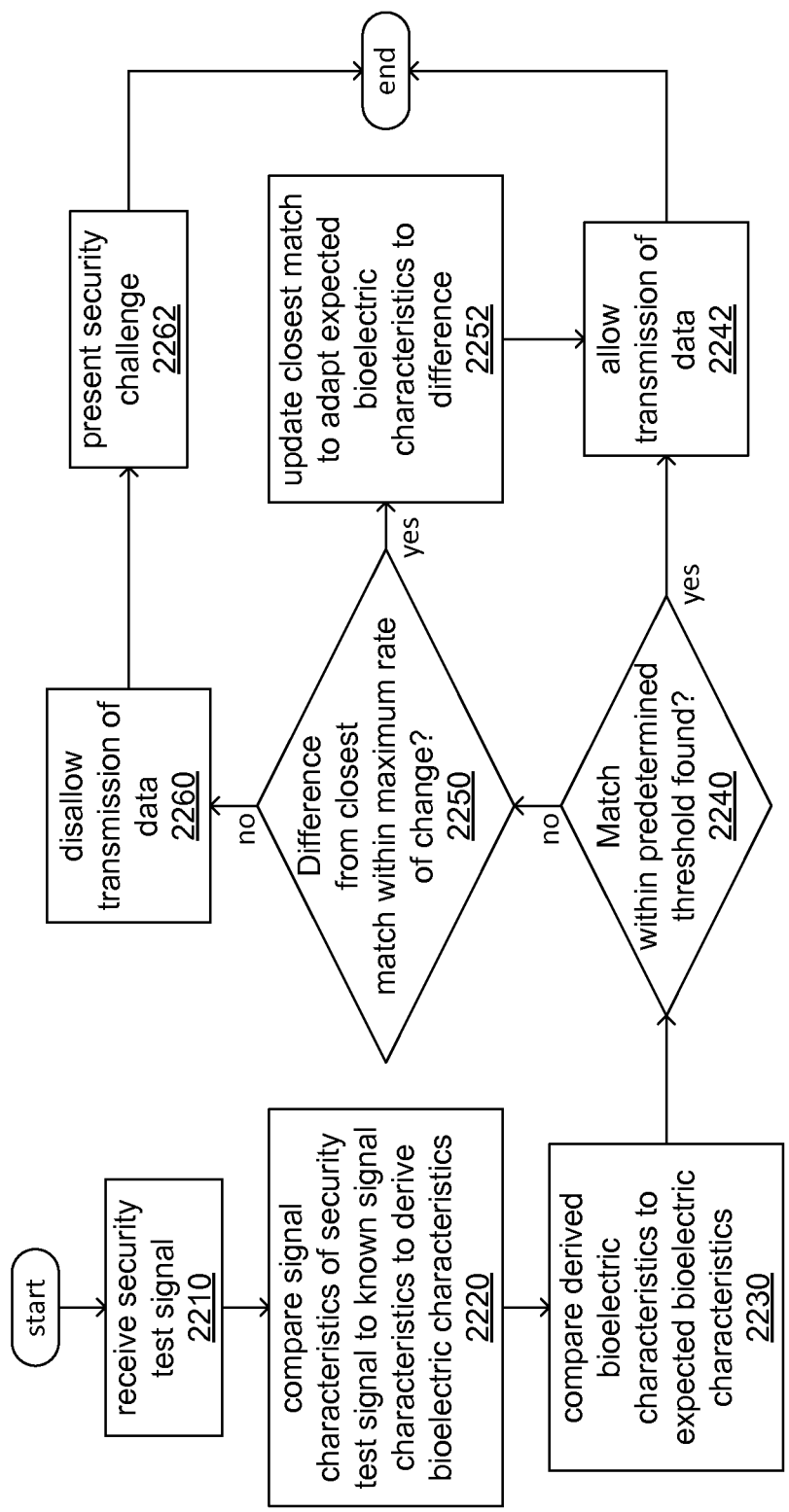

FIG. 8 illustrates one embodiment of a logic flow 2200. The logic flow 2200 may be representative of some or all of the operations executed by one or more embodiments described herein. More specifically, the logic flow 2200 may illustrate operations performed by the processor component 550 in executing at least the control routine 540, and/or performed by other component(s) of one of the body-carried devices 500.

At 2210, a processor component of a body-carried device of a secure communications system (e.g., the processor component 550 of one of the body-carried devices 500 of the secure communications system 1000) receives a security test signal from a body of a BAN in which the body-carried device is enrolled (e.g., one of the BANs 919, 919a or 919b). At 2220, signal characteristics of the security test signal, as received by the body-carried device, are compared to the known signal characteristics of the security test signal as transmitted.

At 2230, the derived bioelectric characteristics are compared to one or more stored expected bioelectric characteristics to attempt to find a match within a predetermined threshold of difference in bioelectric characteristics. If a match within that threshold is found at 2240, then a transmission of data by the body-carried device through the body is allowed to occur at 2242.

However, if no such match is found at 2240, then a check is made at 2250 as to whether the degree of difference in bioelectric characteristics is consistent with a rate of change in bioelectric characteristics of tissues of the body that is within a predetermined maximum rate of change. If so, then the indication of bioelectric characteristics that most closely match the derived bioelectric characteristics is updated at 2252 with the derived bioelectric characteristics to adapt to changes in bioelectric characteristics of the body that normally occur over time. Also, the transmission of data by the body-carried device through the body is allowed to occur at 2242.

However, if the difference in bioelectric characteristics is not consistent with a rate of change within the predetermined maximum rate at 2250, then the transmission of data by the body-carried through the body is disallowed at 2260. Given such a difference in bioelectric characteristics, it is deemed possible that the body-carried device is no longer disposed in close proximity to the body of a person authorized to use it, and a security challenge is presented at 2262 to attempt to employ another mechanism to determine whether the body-carried device is in close proximity to such a body, or not.

Figure 9:
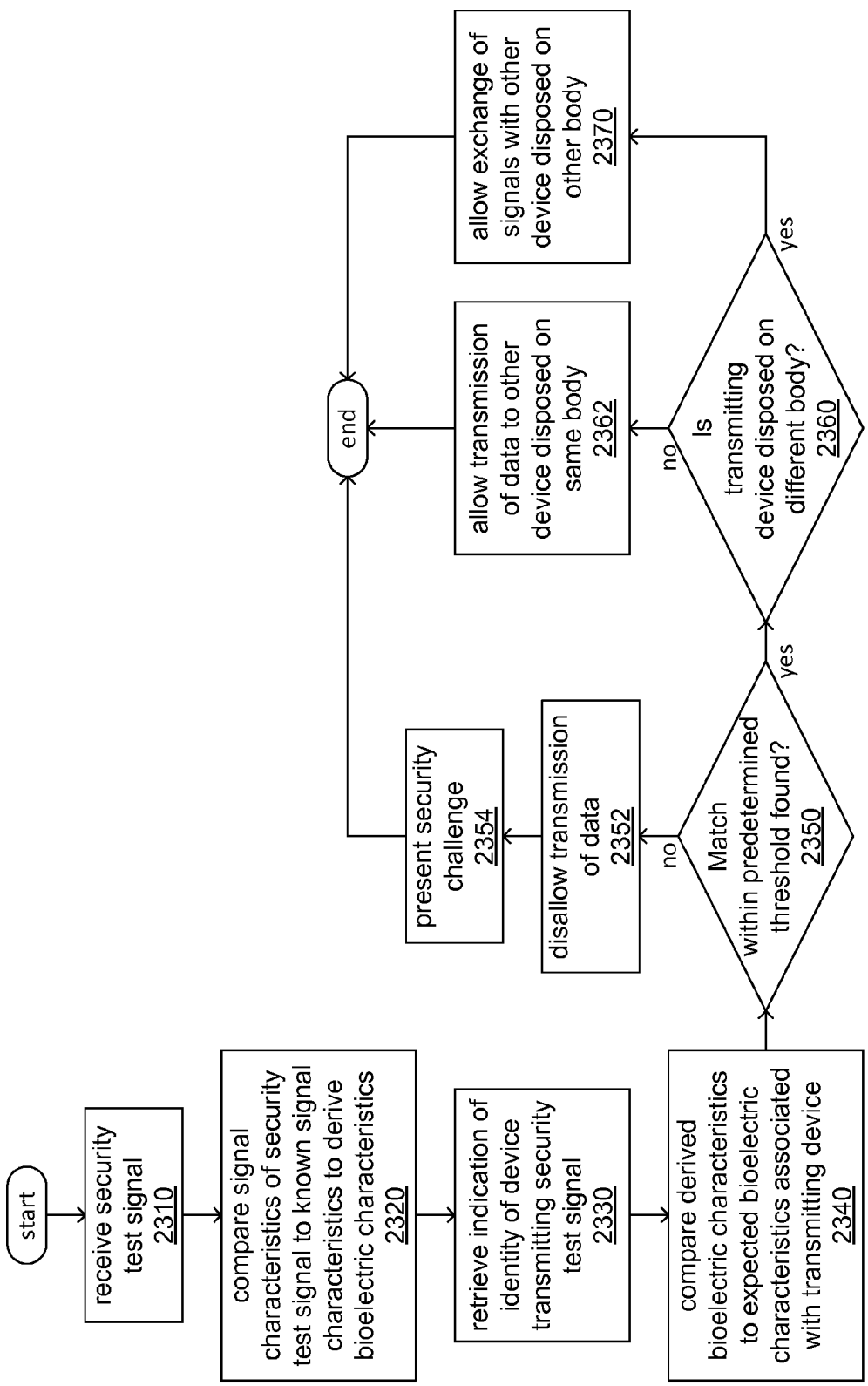

FIG. 9 illustrates one embodiment of a logic flow 2300. The logic flow 2300 may be representative of some or all of the operations executed by one or more embodiments described herein. More specifically, the logic flow 2300 may illustrate operations performed by the processor component 550 in executing at least the control routine 540, and/or performed by other component(s) of one of the body-carried devices 500.

At 2310, a processor component of a body-carried device of a secure communications system (e.g., the processor component 550 of one of the body-carried devices 500 of the secure communications system 1000) receives a security test signal from a body of a BAN in which the body-carried device is enrolled (e.g., one of the BANs 919, 919 a or 919 b). At 2320, signal characteristics of the security test signal, as received by the body-carried device, are compared to the known signal characteristics of the security test signal as transmitted.

At 2330, an indication of the identity of the device that transmitted the security test signal is retrieved from the security test signal. As previously discussed, signals transmitted in the BAN, including security test signals, may be required to include an indication of the identity of the devices that transmit them.

At 2340, the derived bioelectric characteristics are compared to one or more stored expected bioelectric characteristics that are associated with the identified transmitting device to attempt to find a match within a predetermined threshold of difference in bioelectric characteristics. If no match within that threshold is found at 2350, then a transmission of data by the body-carried device through the body is disallowed at 2352, and a security challenge is presented at 2354.

However, if such a match is found at 2350, then a check is made at 2360 as to whether the identified transmitting device is disposed at a location of a body different than the body at which the body-carried device is disposed at close proximity. If not, then the transmission of data by the body-carried device through the body is allowed to occur at 2362.

However, if so, then an exchange of signals with another body-carried device disposed at a location of the different body (e.g., the identified transmitting device) is allowed to occur at 2370. Such an exchange of signals may be an exchange that conveys data, or may be an exchange that conveys an indication to an application routine or other component of the body-carried device that a particular function requiring a conductive coupling of the body with the different body to authorize is now so authorized.

Figure 10:
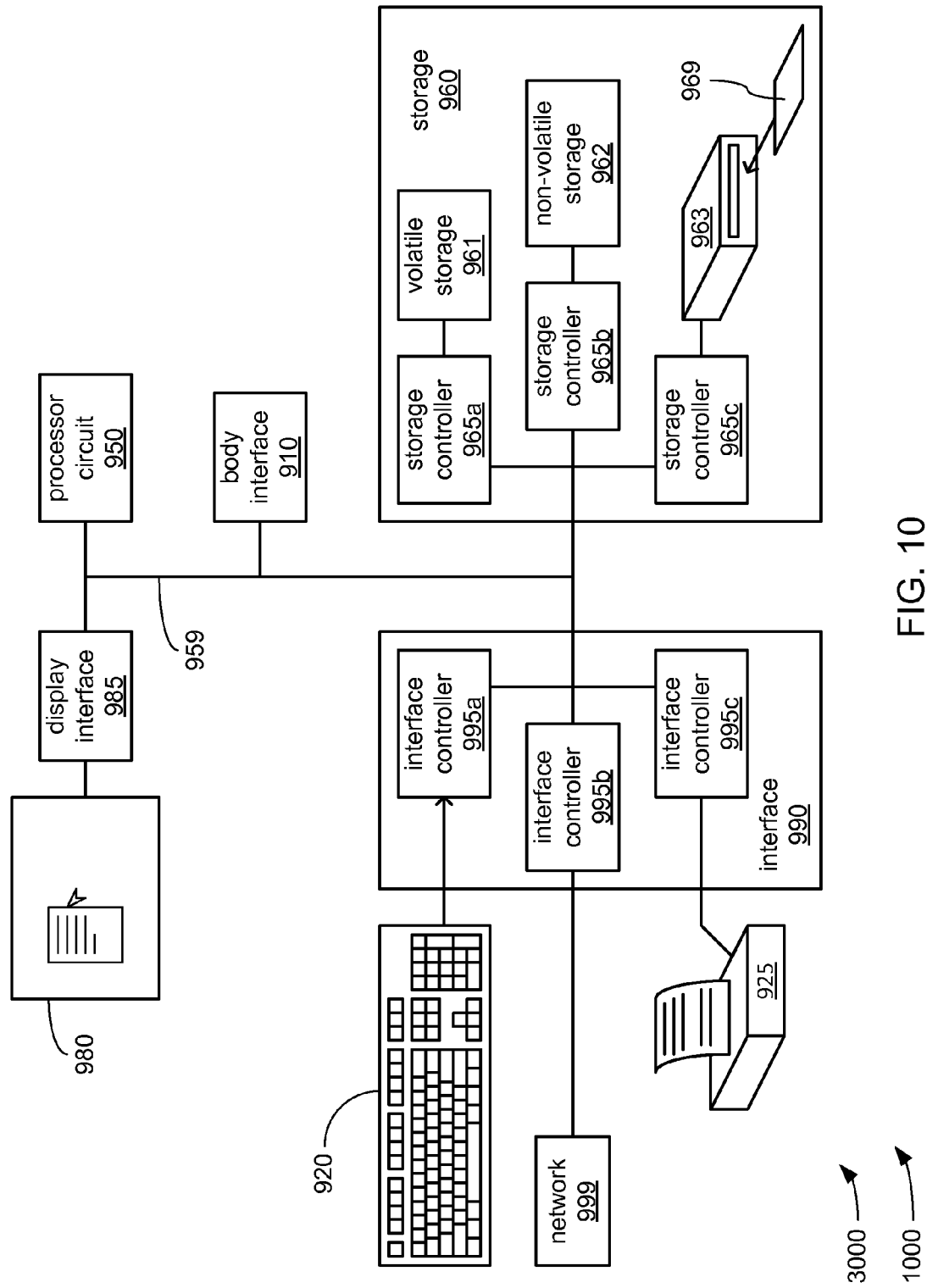
FIG. 10 illustrates a processing architecture according to an embodiment.

FIG. 10 illustrates an embodiment of a processing architecture 3000 suitable for implementing various embodiments as previously described. More specifically, the processing architecture 3000 (or variants thereof) may be implemented as part of one or more of the computing devices 100, 300 or 500. It should be noted that components of the processing architecture 3000 are given reference numbers in which the last two digits correspond to the last two digits of reference numbers of at least some of the components earlier depicted and described as part of these computing devices. This is done as an aid to correlating components of each.

The processing architecture 3000 may include various elements commonly employed in digital processing, including without limitation, one or more processors, multi-core processors, co-processors, memory units, chipsets, controllers, peripherals, interfaces, oscillators, timing devices, video cards, audio cards, multimedia input/output (I/O) components, power supplies, etc. As used in this application, the terms "system" and "component" are intended to refer to an entity of a computing device in which digital processing is carried out, that entity being hardware, a combination of hardware and software, software, or software in execution, examples of which are provided by this depicted exemplary processing architecture. For example, a component can be, but is not limited to being, a process running on a processor component, the processor component itself, a storage device (e.g., a hard disk drive, multiple storage drives in an array, etc.) that may employ an optical and/or magnetic storage medium, an software object, an executable sequence of instructions, a thread of execution, a program, and/or an entire computing device (e.g., an entire computer). By way of illustration, both an application running on a server and the server can be a component. One or more components can reside within a process and/or thread of execution, and a component can be localized on one computing device and/or distributed between two or more computing devices. Further, components may be communicatively coupled to each other by various types of communications media to coordinate operations. The coordination may involve the unidirectional or bi-directional exchange of information. For instance, the components may communicate information in the form of signals communicated over the communications media. The information can be implemented as signals allocated to one or more signal lines. A message (including a command, status, address or data message) may be one of such signals or may be a plurality of such signals, and may be transmitted either serially or substantially in parallel through any of a variety of connections and/or interfaces.

As depicted, in implementing the processing architecture 3000, a computing device may include at least a processor component 950, a storage 960, an interface 990 to other devices, and a coupling 959. As will be explained, depending on various aspects of a computing device implementing the processing architecture 3000, including its intended use and/or conditions of use, such a computing device may further include additional components, such as without limitation, a display interface 985, or a body interface 910.

The coupling 959 may include one or more buses, point-to-point interconnects, transceivers, buffers, crosspoint switches, and/or other conductors and/or logic that communicatively couples at least the processor component 950 to the storage 960. Coupling 959 may further couple the processor component 950 to one or more of the interface 990, the body interface 910 and the display interface 985 (depending on which of these and/or other components are also present). With the processor component 950 being so coupled by couplings 959, the processor component 950 is able to perform the various ones of the tasks described at length, above, for whichever one(s) of the aforedescribed computing devices implement the processing architecture 3000. Coupling 959 may be implemented with any of a variety of technologies or combinations of technologies by which signals are optically and/or electrically conveyed. Further, at least portions of couplings 959 may employ timings and/or protocols conforming to any of a wide variety of industry standards, including without limitation, Accelerated Graphics Port (AGP), CardBus, Extended Industry Standard Architecture (E-ISA), Micro Channel Architecture (MCA), NuBus, Peripheral Component Interconnect (Extended) (PCI-X), PCI Express (PCI-E), Personal Computer Memory Card International Association (PCMCIA) bus, HyperTransport™, QuickPath, and the like.

As previously discussed, the processor component 950 (corresponding to one or more of the processor components 150, 350 or 550) may include any of a wide variety of commercially available processors, employing any of a wide variety of technologies and implemented with one or more cores physically combined in any of a number of ways.

As previously discussed, the storage 960 (corresponding to one or more of the storages 560, 760 or 860) may be made up of one or more distinct storage devices based on any of a wide variety of technologies or combinations of technologies. More specifically, as depicted, the storage 960 may include one or more of a volatile storage 961 (e.g., solid state storage based on one or more forms of RAM technology), a non-volatile storage 962 (e.g., solid state, ferromagnetic or other storage not requiring a constant provision of electric power to preserve their contents), and a removable media storage 963 (e.g., removable disc or solid state memory card storage by which information may be conveyed between computing devices). This depiction of the storage 960 as possibly including multiple distinct types of storage is in recognition of the commonplace use of more than one type of storage device in computing devices in which one type provides relatively rapid reading and writing capabilities enabling more rapid manipulation of data by the processor component 950 (but possibly using a "volatile" technology constantly requiring electric power) while another type provides relatively high density of non-volatile storage (but likely provides relatively slow reading and writing capabilities).

Given the often different characteristics of different storage devices employing different technologies, it is also commonplace for such different storage devices to be coupled to other portions of a computing device through different storage controllers coupled to their differing storage devices through different interfaces. By way of example, where the volatile storage 961 is present and is based on RAM technology, the volatile storage 961 may be communicatively coupled to coupling 959 through a storage controller 965a providing an appropriate interface to the volatile storage 961 that perhaps employs row and column addressing, and where the storage controller 965a may perform row refreshing and/or other maintenance tasks to aid in preserving information stored within the volatile storage 961. By way of another example, where the non-volatile storage 962 is present and includes one or more ferromagnetic and/or solid-state disk drives, the non-volatile storage 962 may be communicatively coupled to coupling 959 through a storage controller 965b providing an appropriate interface to the non-volatile storage 962 that perhaps employs addressing of blocks of information and/or of cylinders and sectors. By way of still another example, where the removable media storage 963 is present and includes one or more optical and/or solid-state disk drives employing one or more pieces of machine-readable storage medium 969, the removable media storage 963 may be communicatively coupled to coupling 959 through a storage controller 965c providing an appropriate interface to the removable media storage 963 that perhaps employs addressing of blocks of information, and where the storage controller 965c may coordinate read, erase and write operations in a manner specific to extending the lifespan of the machine-readable storage medium 969.

One or the other of the volatile storage 961 or the non-volatile storage 962 may include an article of manufacture in the form of a machine-readable storage media on which a routine including a sequence of instructions executable by the processor component 950 to implement various embodiments may be stored, depending on the technologies on which each is based. By way of example, where the non-volatile storage 962 includes ferromagnetic-based disk drives (e.g., so-called "hard drives"), each such disk drive typically employs one or more rotating platters on which a coating of magnetically responsive particles is deposited and magnetically oriented in various patterns to store information, such as a sequence of instructions, in a manner akin to storage medium such as a floppy diskette. By way of another example, the non-volatile storage 962 may be made up of banks of solid-state storage devices to store information, such as sequences of instructions, in a manner akin to a compact flash card. Again, it is commonplace to employ differing types of storage devices in a computing device at different times to store executable routines and/or data. Thus, a routine including a sequence of instructions to be executed by the processor component 950 to implement various embodiments may initially be stored on the machine-readable storage medium 969, and the removable media storage 963 may be subsequently employed in copying that routine to the non-volatile storage 962 for longer term storage not requiring the continuing presence of the machine-readable storage medium 969 and/or the volatile storage 961 to enable more rapid access by the processor component 950 as that routine is executed.

As previously discussed, the interface 990 (corresponding to one or more of the interfaces 190, 390 or 590) may employ any of a variety of signaling technologies corresponding to any of a variety of communications technologies that may be employed to communicatively couple a computing device to one or more other devices. Again, one or both of various forms of wired or wireless signaling may be employed to enable the processor component 950 to interact with input/output devices (e.g., the depicted example keyboard 920 or printer 925) and/or other computing devices, possibly through a network (e.g., the network 999) or an interconnected set of networks. In recognition of the often greatly different character of multiple types of signaling and/or protocols that must often be supported by any one computing device, the interface 990 is depicted as including multiple different interface controllers 995a, 995b and 995c. The interface controller 995a may employ any of a variety of types of wired digital serial interface or radio frequency wireless interface to receive serially transmitted messages from user input devices, such as the depicted keyboard 920. The interface controller 995b may employ any of a variety of cabling-based or wireless signaling, timings and/or protocols to access other computing devices through the depicted network 999 (perhaps a network made up of one or more links, smaller networks, or perhaps the Internet). The interface 995c may employ any of a variety of electrically conductive cabling enabling the use of either serial or parallel signal transmission to convey data to the depicted printer 925. Other examples of devices that may be communicatively coupled through one or more interface controllers of the interface 990 include, without limitation, microphones, remote controls, stylus pens, card readers, finger print readers, virtual reality interaction gloves, graphical input tablets, joysticks, other keyboards, retina scanners, the touch input component of touch screens, trackballs, various sensors, a camera or camera array to monitor movement of persons to accept commands and/or data signaled by those persons via gestures and/or facial expressions, laser printers, inkjet printers, mechanical robots, milling machines, etc.

Where a computing device is communicatively coupled to (or perhaps, actually incorporates) a display (e.g., the depicted example display 980), such a computing device implementing the processing architecture 3000 may also include the display interface 985. Although more generalized types of interface may be employed in communicatively coupling to a display, the somewhat specialized additional processing often required in visually displaying various forms of content on a display, as well as the somewhat specialized nature of the cabling-based interfaces used, often makes the provision of a distinct display interface desirable. Wired and/or wireless signaling technologies that may be employed by the display interface 985 in a communicative coupling of the display 980 may make use of signaling and/or protocols that conform to any of a variety of industry standards, including without limitation, any of a variety of analog video interfaces, Digital Video Interface (DVI), DisplayPort, etc.

More generally, the various elements of the computing devices described and depicted herein may include various hardware elements, software elements, or a combination of both. Examples of hardware elements may include devices, logic devices, components, processors, microprocessors, circuits, processor components, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other. Furthermore, aspects or elements from different embodiments may be combined.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. The detailed disclosure now turns to providing examples that pertain to further embodiments. The examples provided below are not intended to be limiting.

In Example 1, an apparatus to establish secure communications includes a processor component; a signal component for execution by the processor component to compare a signal characteristic of a security test signal to a known signal characteristic of the security test signal to derive a bioelectric characteristic, the security test signal received via a tissue; and a bioelectric component for execution by the processor component to determine whether to allow transmission of data through the tissue based on the bioelectric characteristic.

In Example 2, which includes the subject matter of Example 1, the apparatus may include a body interface to receive the security test signal from a body comprising the tissue and to transmit the data through the body, the body interface may include at least one of a conductive surface, a plate or a coil, and the body interface may be incorporated into at least one of a casing or a manually-operable control.

In Example 3, which includes the subject matter of any of Examples 1-2, the body interface may capacitively couple the processor component to the body.

In Example 4, which includes the subject matter of any of Examples 1-3, the known signal characteristic of the security test signal may include at least one of a known amplitude, a known frequency, a known combination of frequencies, a known pattern of frequency shifts or a known data pattern.

In Example 5, which includes the subject matter of any of Examples 1-4, the bioelectric characteristic may be indicative of a transform effected on the security test signal by at least the tissue, the signal component may compare the signal characteristic of the security test signal to the known signal characteristic to derive the transform, and the bioelectric component may determine whether to allow transmission of the data through the tissue based on the transform.

In Example 6, which includes the subject matter of any of Examples 1-5, the bioelectric component may allow transmission of the data through the tissue based on the bioelectric characteristic matching an expected bioelectric characteristic within a predetermined threshold.

In Example 7, which includes the subject matter of any of Examples 1-6, the bioelectric component may use the bioelectric characteristic to update the expected bioelectric characteristic based on the bioelectric characteristic differing from the expected bioelectric characteristic to a degree that exceeds the predetermined threshold, but remains within a predetermined rate of change in the bioelectric characteristic.

In Example 8, which includes the subject matter of any of Examples 1-7, the bioelectric component may disallow transmission of the data through the tissue based on the bioelectric characteristic differing from the expected bioelectric characteristic to a degree that exceeds the predetermined threshold and that exceeds the predetermined rate of change.

In Example 9, which includes the subject matter of any of Examples 1-8, the bioelectric component may compare the bioelectric characteristic to a plurality of expected bioelectric characteristics and may allow transmission of the data through the tissue based on the bioelectric characteristic matching an expected bioelectric characteristic of the plurality of expected bioelectric characteristics within a predetermined threshold, each expected bioelectric characteristic of the plurality of expected bioelectric characteristics associated with a different location of a body comprising the tissue at which a body-carried device may be disposed to transmit the security test signal.

In Example 10, which includes the subject matter of any of Examples 1-9, the bioelectric component may compare the bioelectric characteristic to a plurality of expected bioelectric characteristics and may allow transmission of the data through the tissue based on the bioelectric characteristic matching an expected bioelectric characteristic of the plurality of expected bioelectric characteristics within a predetermined threshold, each expected bioelectric characteristic of a first subset of the plurality of expected bioelectric characteristics associated with a different location of a body comprising the tissue at which a body-carried device may be disposed, and each expected bioelectric characteristic of a second subset of the plurality of expected bioelectric characteristics associated with a different location of another body at which a body-carried device may be disposed, the other body in conductive contact with the body.

In Example 11, which includes the subject matter of any of Examples 1-10, the apparatus may include a security control component for execution by the processor component to present a security challenge to verify an identity of a body comprising the tissue based on the bioelectric characteristic differing from an expected bioelectric characteristic to a degree that exceeds a predetermined threshold.

In Example 12, which includes the subject matter of any of Examples 1-11, the apparatus may include a display, the security control component to visually present the security challenge on the display.

In Example 13, which includes the subject matter of any of Examples 1-12, the security challenge may include a request to dispose a body-carried device at a location of the body at which the body-carried device was previously disposed, the bioelectric component may await another security test signal from the body-carried device, and the bioelectric component may verify the identity of the body based on a bioelectric characteristic associated with the other security test signal.

In Example 14, an apparatus to establish secure communications may include a processor component, a signal component for execution by the processor component to compare a signal characteristic of a security test signal to a known signal characteristic of the security test signal to derive a transform effected on the security test signal by at least a tissue, the security test signal received via the tissue, and a bioelectric component for execution by the processor component to determine whether to allow transmission of data through the tissue based on the transform.

In Example 15, which includes the subject matter of Example 14, the bioelectric component may allow transmission of the data through the tissue based on the transform matching an expected transform within a predetermined threshold.

In Example 16, which includes the subject matter of any of Examples 14-15, the bioelectric component may use the transform to update the expected transform based on the transform differing from the expected transform to a degree exceeding the predetermined threshold, but within a predetermined rate of change in the transform.

In Example 17, which includes the subject matter of any of Examples 14-16, the bioelectric component may disallow transmission of the data through the tissue based on the transform differing from the expected transform to a degree exceeding the predetermined threshold and exceeding the predetermined rate of change.

In Example 18, which includes the subject matter of any of Examples 14-17, the apparatus may include a security control component for execution by the processor component to present a security challenge based on the transform differing from an expected transform to a degree exceeding a predetermined threshold to verify an identity of a body comprising the tissue.

In Example 19, a computing-implemented method for establishing secure communications may include receiving a security test signal via a tissue, comparing a signal characteristic of the security test signal to a known signal characteristic of the security test signal as transmitted to the tissue to derive a bioelectric characteristic, and determining whether to allow transmission of data through the tissue based on the bioelectric characteristic.

In Example 20, which includes the subject matter of Example 19, the known signal characteristic of the security test signal may include at least one of a known amplitude, a known frequency, a known combination of frequencies, a known pattern of frequency shifts or a known data pattern.

In Example 21, which includes the subject matter of any of Examples 19-20, the bioelectric characteristic may be indicative of a transform effected on the security test signal by at least the tissue, and the method may include comparing the signal characteristic of the security test signal to the known signal characteristic to derive the transform and determining whether to allow transmission of the data through the tissue based on the transform.

In Example 22, which includes the subject matter of any of Examples 19-21, the method may include allowing transmission of the data through the tissue based on the bioelectric characteristic matching an expected bioelectric characteristic within a predetermined threshold.

In Example 23, which includes the subject matter of any of Examples 19-22, the method may include updating the expected bioelectric characteristic with the bioelectric characteristic based on the bioelectric characteristic differing from the expected bioelectric characteristic to a degree that exceeds the predetermined threshold, but remains within a predetermined rate of change in the bioelectric characteristic.

In Example 24, which includes the subject matter of any of Examples 19-23, the method may include disallowing transmission of the data through the tissue based on the bioelectric characteristic differing from the expected bioelectric characteristic to a degree that exceeds the predetermined threshold and that exceeds the predetermined rate of change.

In Example 25, which includes the subject matter of any of Examples 19-24, the method may include presenting a security challenge to verify an identity of a body comprising the tissue based on the bioelectric characteristic differing from an expected bioelectric characteristic to a degree that exceeds a predetermined threshold.

In Example 26, which includes the subject matter of any of Examples 19-25, the method may include visually presenting the security challenge on a display.

In Example 27, which includes the subject matter of any of Examples 19-26, the security challenge may include a request to dispose a body-carried device at a location of the body at which the body-carried device was previously disposed, and the method may include awaiting another security test signal from the body-carried device and verifying the identity of the body based on a bioelectric characteristic associated with the other security test signal.

In Example 28, which includes the subject matter of any of Examples 19-27, the method may include retrieving an indication of an identity of a device that transmitted the security test signal, and allowing transmission of the data through the tissue based on the bioelectric characteristic and whether the device that transmitted the security test is disposed in close proximity to a body comprising the tissue or to another body in conductive contact with the body.

In Example 29, which includes the subject matter of any of Examples 19-28, the method may include retrieving an indication of an identity of a device that transmitted the security test signal, and allowing an application routine to perform a function based on the bioelectric characteristic and whether the device that transmitted the security test is disposed in close proximity to a body comprising the tissue or to another body in conductive contact with the body.

In Example 30, at least one machine-readable storage medium includes instructions that when executed by a computing device, cause the computing device to receive a security test signal via a tissue, compare a signal characteristic of the security test signal to a known signal characteristic of the security test signal as transmitted to the tissue to derive a bioelectric characteristic, and determine whether to allow transmission of data through the tissue based on the bioelectric characteristic.

In Example 31, which includes the subject matter of Example 30, the known signal characteristic of the security test signal comprising at least one of a known amplitude, a known frequency, a known combination of frequencies, a known pattern of frequency shifts or a known data pattern.

In Example 32, which includes the subject matter of any of Examples 30-31, the bioelectric characteristic may be indicative of a transform effected on the security test signal by at least the tissue, and the computing device may be caused to compare the signal characteristic of the security test signal to the known signal characteristic to derive the transform, and determine whether to allow transmission of the data through the tissue based on the transform.

In Example 33, which includes the subject matter of any of Examples 30-32, the computing device may be caused to allow transmission of the data through the tissue based on the bioelectric characteristic matching an expected bioelectric characteristic within a predetermined threshold.

In Example 34, which includes the subject matter of any of Examples 30-33, the computing device may be caused to update the expected bioelectric characteristic with the bioelectric characteristic based on the bioelectric characteristic differing from the expected bioelectric characteristic to a degree that exceeds the predetermined threshold, but remains within a predetermined rate of change in the bioelectric characteristic.

In Example 35, which includes the subject matter of any of Examples 30-34, the computing device may be caused to disallow transmission of the data through the tissue based on the bioelectric characteristic differing from the expected bioelectric characteristic to a degree that exceeds the predetermined threshold and that exceeds the predetermined rate of change.

In Example 36, which includes the subject matter of any of Examples 30-35, the computing device may be caused to present a security challenge to verify an identity of a body comprising the tissue based on the bioelectric characteristic differing from an expected bioelectric characteristic to a degree that exceeds a predetermined threshold.

In Example 37, which includes the subject matter of any of Examples 30-36, the computing device may be caused to visually present the security challenge on a display.

In Example 38, which includes the subject matter of any of Examples 30-37, the security challenge may include a request to dispose a body-carried device at a location of the body at which the body-carried device was previously disposed, and the computing device may be caused to await another security test signal from the body-carried device and verify the identity of the body based on a bioelectric characteristic associated with the other security test signal.

In Example 39, which includes the subject matter of any of Examples 30-38, the computing device may be caused to retrieve an indication of an identity of a device that transmitted the security test signal, and allow transmission of the data through the tissue based on the bioelectric characteristic and whether the device that transmitted the security test is disposed in close proximity to a body comprising the tissue or to another body in conductive contact with the body.

In Example 40, which includes the subject matter of any of Examples 30-39, the computing device may be caused to retrieve an indication of an identity of a device that transmitted the security test signal, and allow an application routine to perform a function based on the bioelectric characteristic and whether the device that transmitted the security test is disposed in close proximity to a body comprising the tissue or to another body in conductive contact with the body.

In Example 41, an apparatus to receive commands includes means for receiving a security test signal via a tissue, comparing a signal characteristic of the security test signal to a known signal characteristic of the security test signal as transmitted to the tissue to derive a bioelectric characteristic, and determining whether to allow transmission of data through the tissue based on the bioelectric characteristic.

In Example 42, which includes the subject matter of Example 41, the known signal characteristic of the security test signal comprising at least one of a known amplitude, a known frequency, a known combination of frequencies, a known pattern of frequency shifts or a known data pattern.

In Example 43, which includes the subject matter of any of Examples 41-42, the bioelectric characteristic indicative of a transform effected on the security test signal by at least the tissue, and the apparatus may include means for comparing the signal characteristic of the security test signal to the known signal characteristic to derive the transform and determining whether to allow transmission of the data through the tissue based on the transform.

In Example 44, which includes the subject matter of any of Examples 41-43, the apparatus may include means for allowing transmission of the data through the tissue based on the bioelectric characteristic matching an expected bioelectric characteristic within a predetermined threshold.

In Example 45, which includes the subject matter of any of Examples 41-44, the apparatus may include means for updating the expected bioelectric characteristic with the bioelectric characteristic based on the bioelectric characteristic differing from the expected bioelectric characteristic to a degree that exceeds the predetermined threshold, but remains within a predetermined rate of change in the bioelectric characteristic.

In Example 46, which includes the subject matter of any of Examples 41-45, the apparatus may include means for disallowing transmission of the data through the tissue based on the bioelectric characteristic differing from the expected bioelectric characteristic to a degree that exceeds the predetermined threshold and that exceeds the predetermined rate of change.

In Example 47, which includes the subject matter of any of Examples 41-46, the apparatus may include means for presenting a security challenge to verify an identity of a body comprising the tissue based on the bioelectric characteristic differing from an expected bioelectric characteristic to a degree that exceeds a predetermined threshold.

In Example 48, which includes the subject matter of any of Examples 41-47, the apparatus may include means for visually presenting the security challenge on a display.

In Example 49, which includes the subject matter of any of Examples 41-48, the security challenge may include a request to dispose a body-carried device at a location of the body at which the body-carried device was previously disposed, the apparatus may include means for awaiting another security test signal from the body-carried device and verifying the identity of the body based on a bioelectric characteristic associated with the other security test signal.

In Example 50, which includes the subject matter of any of Examples 41-49, the apparatus may include means for retrieving an indication of an identity of a device that transmitted the security test signal, and allowing transmission of the data through the tissue based on the bioelectric characteristic and whether the device that transmitted the security test is disposed in close proximity to a body comprising the tissue or to another body in conductive contact with the body.

In Example 51, which includes the subject matter of any of Examples 41-50, the apparatus may include means for retrieving an indication of an identity of a device that transmitted the security test signal and allowing an application routine to perform a function based on the bioelectric characteristic and whether the device that transmitted the security test is disposed in close proximity to a body comprising the tissue or to another body in conductive contact with the body.

In Example 52, at least one machine-readable storage medium may include instructions that when executed by a computing device, cause the computing device to perform any of the above.

In Example 53, an apparatus to assign processor component cores to perform task portions may include means for performing any of the above.

The invention claimed is:

1. An apparatus to establish secure communications comprising:
   a processor circuit;
   a signal component for execution by the processor circuit to compare a signal characteristic of a security test signal to a known signal characteristic of the security test signal to derive a bioelectric characteristic, the security test signal received via a tissue; and a bioelectric component for execution by the processor circuit, the bioelectric component to allow transmission of data through the tissue when the bioelectric characteristic matches an expected bioelectric characteristic of the plurality of expected bioelectric characteristics, each expected bioelectric characteristic of a first subset of the plurality of expected bioelectric characteristics associated with a different location of a body comprising the tissue at which a body-carried device may be disposed to transmit the security test signal, and each expected bioelectric characteristic of a second subset of the plurality of expected bioelectric characteristics associated with a different location of another body at which the body-carried device may be disposed, the other body in conductive contact with the body.

2. The apparatus of claim 1, comprising a body interface to receive the security test signal from the body comprising the tissue and to transmit the data through the body, the body interface comprising at least one of a conductive surface, a plate or a coil, and the body interface incorporated into at least one of a casing or a manually-operable control.

3. The apparatus of claim 1, the bioelectric characteristic indicative of a transform effected on the security test signal by at least the tissue, the signal component to compare the signal characteristic of the security test signal to the known signal characteristic to derive the transform, and the bioelectric component to determine whether to allow transmission of the data through the tissue based on the transform.

4. The apparatus of claim 1, the bioelectric component to allow transmission of the data through the tissue when the bioelectric characteristic matches an expected bioelectric characteristic within a predetermined threshold.

5. The apparatus of claim 4, the bioelectric component to use the bioelectric characteristic to update the expected bioelectric characteristic when the bioelectric characteristic differs from the expected bioelectric characteristic to a degree that exceeds the predetermined threshold, but remains within a predetermined rate of change in the bioelectric characteristic.

6. The apparatus of claim 1, the bioelectric component to compare the bioelectric characteristic to the plurality of bioelectric characteristics and to allow transmission of the data through the tissue when the bioelectric characteristic matches the expected bioelectric characteristic within a predetermined threshold.

7. An apparatus to establish secure communications comprising:

a processor circuit;

a signal component for execution by the processor circuit to compare a signal characteristic of a security test signal to a known signal characteristic of the security test signal to derive a transform effected on the security test signal by at least a tissue, the security test signal received via the tissue; and a bioelectric component for execution by the processor circuit, the bioelectric component to allow transmission of data through the tissue when the transform matches an expected transform of the plurality of expected transforms, each expected transform of a first subset of the plurality of expected transforms associated with a different location of a body comprising the tissue at which a body-carried device may be disposed to transmit the security test signal, and each expected transform of a second subset of the plurality of expected transforms associated with a different location of another body at which the body-carried device may be disposed, the other body in conductive contact with the body.

8. The apparatus of claim 7, the bioelectric component to allow transmission of the data through the tissue when the transform matches the expected transform within a predetermined threshold.

9. The apparatus of claim 8, the bioelectric component to use the transform to update the expected transform when the transform differs from the expected transform to a degree that exceeds the predetermined threshold, but within a predetermined rate of change in the transform.

10. The apparatus of claim 9, the bioelectric component to disallow transmission of the data through the tissue when the transform differs from the expected transform to a degree that exceeds the predetermined threshold and that exceeds the predetermined rate of change.

11. The apparatus of claim 7, comprising a security control component for execution by the processor circuit to present a security challenge when the transform differs from an expected transform to a degree that exceeds a predetermined threshold to verify an identity of the body comprising the tissue.

12. A computing-implemented method for establishing secure communications comprising:

receiving a security test signal via a tissue;

comparing a signal characteristic of the security test signal to a known signal characteristic of the security test signal as transmitted to the tissue to derive a bioelectric characteristic; and allowing transmission of data through the tissue based on the bioelectric characteristic matching an expected bioelectric characteristic of the plurality of expected bioelectric characteristics, each expected bioelectric characteristic of a first subset of the plurality of expected bioelectric characteristics associated with a different location of a body comprising the tissue at which a body-carried device may be disposed to transmit the security test signal, and each expected bioelectric characteristic of a second subset of the plurality of expected bioelectric characteristics associated with a different location of another body at which the body-carried device may be disposed, the other body in conductive contact with the body.

13. The computer-implemented method of claim 12, the known signal characteristic of the security test signal comprising at least one of a known amplitude, a known frequency, a known combination of frequencies, a known pattern of frequency shifts or a known data pattern.

14. The computer-implemented method of claim 12, comprising allowing transmission of the data through the tissue based on the bioelectric characteristic matching an expected bioelectric characteristic within a predetermined threshold.

15. The computer-implemented method of claim 14, comprising updating the expected bioelectric characteristic with the bioelectric characteristic based on the bioelectric characteristic differing from the expected bioelectric characteristic to a degree that exceeds the predetermined threshold, but remains within a predetermined rate of change in the bioelectric characteristic.

16. The computer-implemented method of claim 15, comprising disallowing transmission of the data through the tissue based on the bioelectric characteristic differing from the expected bioelectric characteristic to a degree that exceeds the predetermined threshold and that exceeds the predetermined rate of change.

17. The computer-implemented method of claim 12, comprising presenting a security challenge to verify an identity of the body comprising the tissue based on the bioelectric characteristic differing from an expected bioelectric characteristic to a degree that exceeds a predetermined threshold.

18. At least one non-transitory machine-readable storage medium comprising instructions that when executed by a computing device, cause the computing device to:
   receive a security test signal via a tissue;
   compare a signal characteristic of the security test signal to a known signal characteristic of the security test signal as transmitted to the tissue to derive a bioelectric characteristic; and
   to allow transmission of data through the tissue when the bioelectric characteristic matches an expected bioelectric characteristic of the plurality of expected bioelectric characteristics, each expected bioelectric characteristic of a first subset of the plurality of expected bioelectric characteristics associated with a different location of a body comprising the tissue at which a body-carried device may be disposed to transmit the security test signal, and each expected bioelectric characteristic of a second subset of the plurality of expected bioelectric characteristics associated with a different location of another body at which the body-carried device may be disposed, the other body in conductive contact with the body.

19. The at least one non-transitory machine-readable storage medium of claim 18, the computing device caused to allow transmission of the data through the tissue when the bioelectric characteristic matches the expected bioelectric characteristic within a predetermined threshold.

20. The at least one non-transitory machine-readable storage medium of claim 19, the computing device caused to update the expected bioelectric characteristic with the bioelectric characteristic when the bioelectric characteristic differs from the expected bioelectric characteristic to a degree that exceeds the predetermined threshold, but remains within a predetermined rate of change in the bioelectric characteristic.

21. The at least one non-transitory machine-readable storage medium of claim 20, the computing device caused to disallow transmission of the data through the tissue when the bioelectric characteristic differs from the expected bioelectric characteristic to a degree that exceeds the predetermined threshold and that exceeds the predetermined rate of change.

22. The at least one non-transitory machine-readable storage medium of claim 18, the computing device caused to present a security challenge to verify an identity of the body comprising the tissue when the bioelectric characteristic differs from the expected bioelectric characteristic to a degree that exceeds a predetermined threshold.

23. The at least one non-transitory machine-readable storage medium of claim 22, the security challenge comprising a request to dispose the body-carried device at a location of the body at which the body-carried device was previously disposed, the computing device caused to:
   await another security test signal from the body-carried device; and
   verify the identity of the body based on a bioelectric characteristic associated with the other security test signal.

24. The at least one non-transitory machine-readable storage medium of claim 18, the computing device caused to:
   retrieve an indication of an identity of a device that transmitted the security test signal; and
   allow an application routine to perform a function based on the bioelectric characteristic and whether the device that transmitted the security test is disposed in close proximity to the body comprising the tissue or to another body in conductive contact with the body.

* * * * *